(12) United States Patent
Kroonmaa et al.

(10) Patent No.: US 10,103,893 B2
(45) Date of Patent: Oct. 16, 2018

(54) BLOCKCHAIN-SUPPORTED, FAIL-SAFE SYNCHRONIZATION IN A DATA AUTHENTICATION INFRASTRUCTURE

(71) Applicant: GUARDTIME IP HOLDINGS LIMITED, Tortola (VG)

(72) Inventors: Andres Kroonmaa, Saue Vald (EE); Ahto Buldas, Tallinn (EE); Jeffrey Pearce, Hilo, HI (US)

(73) Assignee: GUARDTIME IP HOLDINGS, LTD., Tortola (VG)

( * ) Notice: Subject to any disclaimer, the term of this patent is extended or adjusted under 35 U.S.C. 154(b) by 0 days.

(21) Appl. No.: 15/913,816

(22) Filed: Mar. 6, 2018

(65) Prior Publication Data

US 2018/0198626 A1    Jul. 12, 2018

Related U.S. Application Data

(63) Continuation-in-part of application No. 14/633,147, filed on Feb. 27, 2015, now Pat. No. 9,911,007.

(51) Int. Cl.
| | |
|---|---|
| *G06F 21/64* | (2013.01) |
| *H04L 9/32* | (2006.01) |
| *H04L 9/06* | (2006.01) |
| *G06F 17/30* | (2006.01) |

(52) U.S. Cl.
CPC ...... *H04L 9/3247* (2013.01); *G06F 17/30283* (2013.01); *G06F 17/30327* (2013.01); *G06F 17/30575* (2013.01); *H04L 9/0637* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 5,946,396 | A * | 8/1999 | Davis | H04L 9/3236 380/200 |
| 2003/0004835 | A1 * | 1/2003 | Grey | G06Q 30/06 705/26.41 |
| 2009/0100041 | A1 * | 4/2009 | Wilson | G06F 21/645 |
| 2012/0324229 | A1 * | 12/2012 | Buldas | H04L 9/321 713/176 |
| 2013/0276058 | A1 * | 10/2013 | Buldas | G06F 21/64 726/2 |

\* cited by examiner

*Primary Examiner* — William J. Goodchild
(74) *Attorney, Agent, or Firm* — Jeffrey Pearce

(57) ABSTRACT

A distributed hash tree-based authentication system for digital input records has more than one upper-level core node, each of which receives at least one uppermost value from aggregators. Communicating with each other about which aggregator values they have received, the nodes try to reach agreement as to which of these values should be included in duplicated current intra-node hash tree evaluations so as to form a consistent top-level value used as the basis for digital signatures associated with the digital input records. The top-level value is then entered either directly, or after combination with other top-level values over a period, into a block of a blockchain.

17 Claims, 13 Drawing Sheets

BLOCKCHAIN-SUPPORTED, FAIL-SAFE SYNCHRONIZATION IN A DATA AUTHENTICATION INFRASTRUCTURE

CROSS-REFERENCE TO RELATED APPLICATIONS

This application is a Continuation-in-Part of U.S. patent application Ser. No. 14/633,147, filed 27 Feb. 2015, which issued as U.S. Pat. No. 9,911,007 on 6 Mar. 2018.

FIELD OF THE INVENTION

This invention relates to a system and related method of operation for ensuring consistency of data processed by a plurality of upper-level systems, in particular, in a data authentication infrastructure.

BACKGROUND

The ability to verify the authenticity of digital data in the electronic age has become more challenging at the same time as it has become more needed. Documents (defined broadly as any body of digitized information) in electronic form are everywhere in modern banking, commerce, government, law, indeed, in modern life in general. In a world where documents are created, submitted, processed, stored, considered, etc., all electronically, sometimes even in multiple locations in the "cloud" unknown to the users themselves, notary or other official seals, physical signatures, special papers and other such tools are becoming increasingly unsuitable and unreliable.

Perhaps the most common way at present to verify the authenticity of electronic documents is to use some form of digital certificate to "sign" them, which is typically accomplished using some form of asymmetric cryptography. Public key cryptography is fast enough to enable almost instantaneous certificate generation. However, there is an inherent weakness in using asymmetric cryptography to create digital signatures: Cryptographic signature keys may become compromised. Once a key has become compromised, the certificates created with that key are no longer verifiable. Since the likelihood that a key will become compromised increases over time, certificates created by using keyed cryptography are useful only for a short term.

Key-based systems suffer from other disadvantages as well. For one thing, it becomes necessary to keep track of sometimes very large sets of keys and whether they are still valid.

Many common systems treat each digital record as a free-standing entity unrelated to any other—keys are generated for each record, and security depends on that key set. Nothing that happens to any other record, or at any other time, will reflect in information associated with a given record. Entire systems can therefore be compromised without an individual user being aware of it.

Some other systems increase verifiability by creating a data structure in which information from more than one record at a time is used to compute a composite, higher-level value that can be used to help detect unauthorized changes to any of the records. For example, a tree structure of hash values (for example, a Merkle tree structure) of digital input records can create a single, highest level verification value such that even the smallest change to one input record will yield a different highest-level value upon recomputation and reveal that a change has occurred.

When it comes to verifying the authenticity of digital documents, regardless of whether the user cares about proof of receipt order or not, most existing methods have the serious flaw that users must in some way trust some service provider at some point. In other words, even with a theoretically trustworthy verification scheme, one must then instead trust the entity that performs the verification. Trust in such systems is sometimes unwarranted, but is always a reason at least for concern. In 2007, for example, it was observed that the BSAFE cryptographic library of RSA Security (a major provider of cryptographic technologies) used as a default the DUAL_EC_DRBG random number generator, which included a "back door" that resulted from use of a set of initiating numbers supplied to RSA by the U.S. National Security Agency. Even with the best keys, therefore, one must still wonder about the trustworthiness of the keymaker.

One alternative to total reliance on keys includes publishing a digital record along with some verifying information. This may avoid the need for such trust, but a pure publication-verification scheme is unsuitable for large collections of documents that each may need authentication. In other words, one or both of two common problems beset known authentication schemes: either there must be some "trust authority" or the systems are not amenable to extensive scalability.

Guardtime AS of Tallinn, Estonia, provides a distributed, hash tree-based data-verification system that does not rely on keys at all, is highly scalable, and that, in the most developed embodiment, avoids the need for trust even in the Guardtime system itself—verification of a given data set may be carried out independently, relying only on mathematical procedures open to all.

FIGS. 1-5 illustrate the general infrastructure of the distributed hash tree infrastructure used to validate data in a system such as the one provided by Guardtime, including an embodiment that includes publication for second, higher-level verification. Sets of digital data ("documents" or "digital records") are input by a set of lowest-level systems that comprise clients 2000. The digital data is transformed using a hash function, which provides a hash output value. This client-level hash output value forms a low-level node in a global hash tree and is, accordingly, then hashed in successively higher levels with other nodes in gateways 3000, which in turn hash their various nodes in respective internal hash tree structures to form inputs to aggregators 4000. The aggregators in turn hash their input nodes in a tree structure to form highest level aggregator hash values, which are submitted as inputs to input nodes of a hash tree structure in a core system 5000, which in turn hashes at least the current set of input node values together to form a root hash value that forms a current value $t_i$ in a calendar 6000. For each client-level input data set, a unique digital signature is returned that encodes, among other optional data, the hash values of "sibling nodes" in the global hash tree, as well as the corresponding calendar value, such that, given the data set and the signature, one can recompute one's way upward through the global hash tree. If the resulting uppermost computation matches the calendar value, there is an exceptionally high level of certainty that the data set is identical to the one that led to the digital signature.

The operation of the system shown in FIGS. 1-5 is described in greater detail below, but is summarized here so as to illustrate a potential weakness: If the verification infrastructure is implemented such that a single core 5000 processes all requests for signatures, then this core represents a single point of failure with respect to the entire signature and verification infrastructure. In other words, if, for some reason, for example, the server that forms the core, or the network connection to the core, were to fail, then no clients would be able to digitally sign input records. At a lower level, if one of the aggregators were to fail, or its network connection to the core were to fail or become too slow, then no client whose requests feed to that aggregator would be able to get digital signatures at all, or within a current period. What is needed is therefore a way to overcome the concern about single-point-of-failure, while still providing well-determined data signatures that can be used for later data validation.

DETAILED DESCRIPTION

Various embodiments of a method and various system implementations are described to reduce or eliminate at least one aspect of the problem of single-point-of-failure in a digital record validation infrastructure that is arranged as a tree structure. To understand modifications to a basic authentication infrastructure to provide for a fail-safe mechanism, it is helpful first to understand a suitable example of a distributed hash tree infrastructure in a bit more detail than is summarized above. Additional embodiments use a blockchain as an immutable data structure for storing the values that result from the fail-safe mechanism.

Distributed Hash Tree Infrastructure

Figure 1:
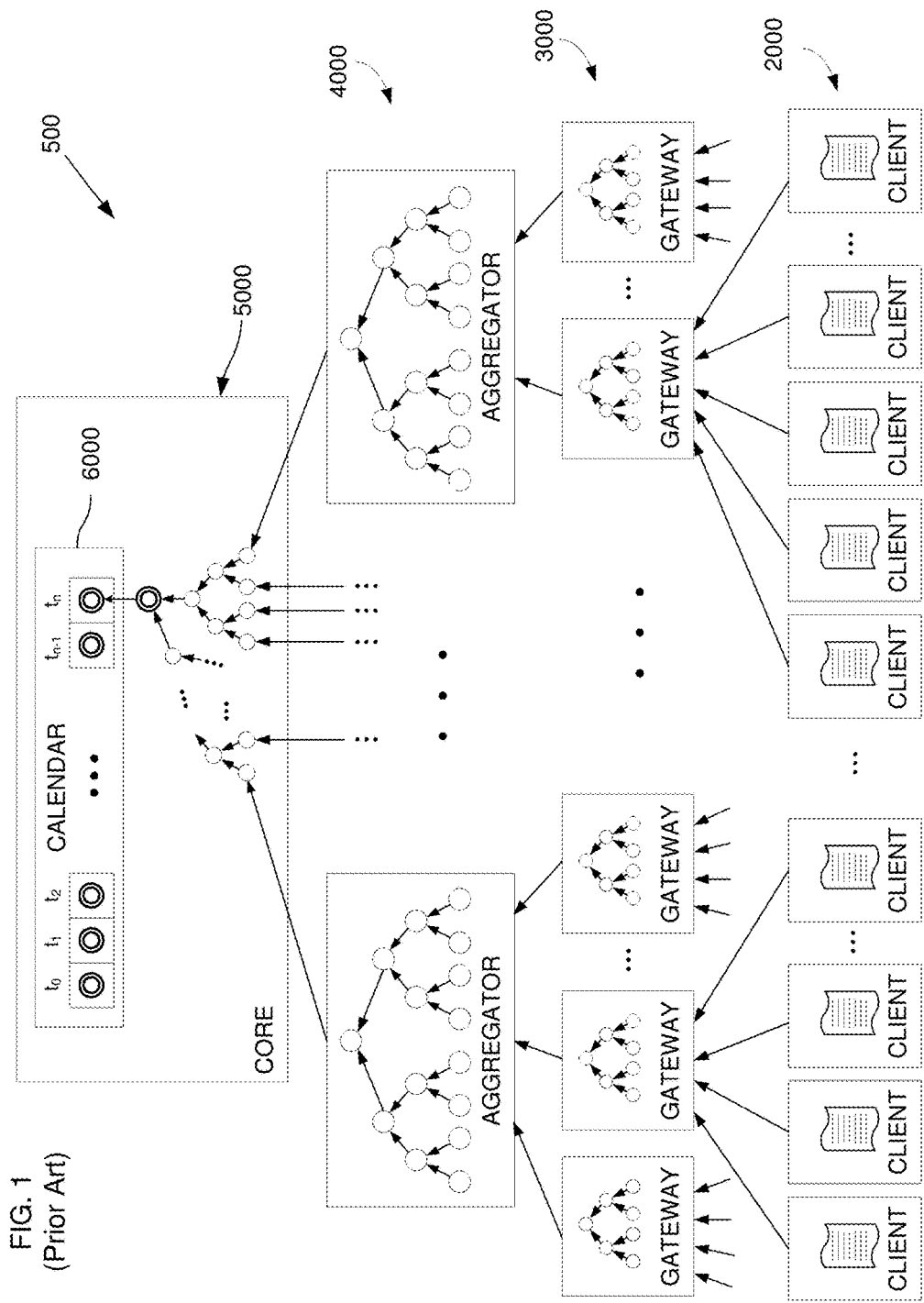
FIG. 1 illustrates various layers of a generalized digital record verification and signing infrastructure.
Figure 2:
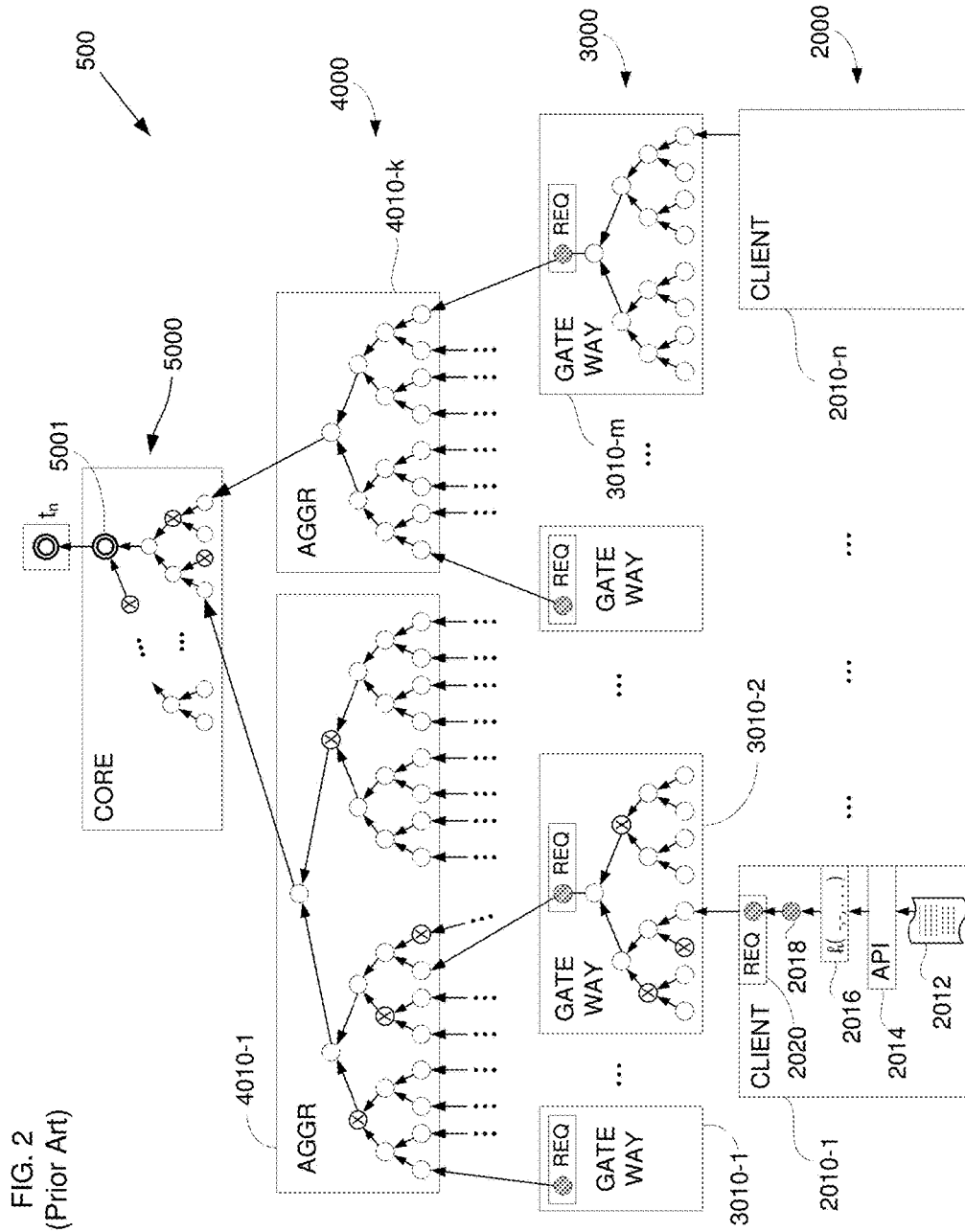
FIG. 2 illustrates the verification infrastructure along with various data and computational structures maintained and computed within different layers.

FIGS. 1 and 2 illustrate a distributed, keyless, hash tree-based digital record-authentication infrastructure such as is provided by Guardtime AS of Tallinn, Estonia. The general infrastructure has several different layers: a client layer 2000 comprising a number of client systems; a layer of gateways 3000; a layer including one or more aggregation systems 4000; and an uppermost layer 5000 that includes a "core". Typically, the gateways, aggregators and the core will be servers, with known network connections and network communication hardware and software. The "user-level" client systems may also be servers, but, depending on the implementation, some or all may also be more individualized workstations, laptop, personal or other mobile computing devices, etc. Although FIG. 1 shows the various layers as being separate and distinct, some implementations of the main principles of the infrastructure might consolidate or do without some of the layers or might need to add additional layers for administrative or other purposes.

As FIG. 1 also illustrates, the core layer 5000 will in general be common to all users of the system, whereas lower layers 2000, 3000, 4000 will in many implementations have unique configurations depending on the needs and preferences of users. The distinction between "core/common" and "unique/distributed" is not hard and fast, however—in some implementations, the core, that is, centrally administered system/server, will encompass structures and functions that also are used in lower layers. One of the advantages of this infrastructure is that it allows for almost unlimited scalability and reconfiguration of the non-core layers to meet particular implementation needs. All that is required is that the various layers perform the specified functions, with common protocols for entering a digital record into the verification system and for generating registration requests.

In the illustrated arrangement, a client is the system where digital records are prepared and entered into the verification/signature system. A digital record may be any set of binary data that one later wishes to verify has not changed since initial registration and signing using the infrastructure. Thus, the term "digital record" could be a digital representation of an image, an audio file (or combined audio-visual data such as from a video camera), a digitally created or converted document, etc. Generally, a "digital record" therefore may be anything that can be represented as a set of binary data, regardless of source, manner of creation or method of storage. In short, a client is any system where a representation of any type of information is input, created or otherwise presented (with or without human involvement) in digital form such that it can be processed and registered using the infrastructure according to the invention.

A gateway in the layer 3000 will typically be a computer system such as a server with which one or more of the clients communicates so as to receive requests for registration of digital records that its clients submit. In many implementations, a gateway will be a server controlled by an enterprise or some third-party provider, which may be a server known to and maybe even controlled by an organization to which the client user belongs, or a server accessed through a network such as the Internet. In short, a gateway may generally be any server located anywhere and configured to receive requests from clients for digital record registration. Gateway systems do not need to be of the same type; rather, one gateway might be a server within a company that employs many clients, whereas another gateway might be a server accessible online by arbitrary users.

An aggregator in the aggregation layer 4000 will similarly be a computer system such as a server intended to receive registration requests that have been consolidated by respective gateways. Depending upon the scale and design requirements of a given implementation, any aggregator could also be controlled by the owner of the core, or the owner of the same systems as the gateways and clients, or could be provided by an entirely different entity, and in some cases it would also be possible to consolidate the aggregator and gateways for particular set of clients.

As an example, large corporations or government entities might prefer to implement and benefit from the advantages of the infrastructure using only their own dedicated systems. Nearer the other end of the spectrum of possibilities would be that the gateways and aggregators could all be configured using "cloud computing" such that a user at the client level has no idea where any particular gateway or aggregator is located or who controls the servers. One of the advantages of this infrastructure is that digital input records can still be verified with near total security even in situations where users and others do not know if they can trust the systems in the gateway or aggregation layers 3000, 4000; indeed, it is not even necessary to trust the administrator of the core 5000 in order to have essentially total reliability of verification.

The different terms "aggregator" in layer(s) 4000 and "gateway" in layer(s) 3000 are not intended to imply that the systems (such as servers) that comprise them are functionally significantly different—a gateway "aggregates" the requests of the clients it serves and as such could be viewed as a "local" or "lower level" aggregator in its own right. In many implementations, however, gateways may be under the control of entities more closely associated with the clients and aggregators may be more closely associated with the overall system administrator that maintains the core. This is not a hard and fast distinction, however. As shown below, some of the functional components associated with an aggregator may be also located within the core. In short, although the various client systems, gateways, aggregators and core(s) will typically be separate computers, such as servers, the logical and functional distinctions are not necessarily as fixed.

Each of the various computer systems participating in the infrastructure will of course include the hardware (CPU(s), memory, storage, network interface devices, etc.) and software (including system software such as an operating system, computational modules to perform the various hashing operations described below and to maintain internal data structures and results, etc.) needed to implement the registration and authentication processes described here. Except with respect to the components specific to implementing the various embodiments described here, these hardware and software components are well known to system designers and are therefore not discussed in further detail.

FIG. 2 shows the infrastructure of FIG. 1 in more detail. In FIG. 2, various clients are represented as 2010-1, . . . , 2010-n; gateways are represented as 3010-1, 3010-2, . . . , 3010-m; and two aggregators are shown as 4010-1, 4010-k. Some aggregator will typically communicate into each of the lowest level hash tree nodes within the core, as described in more detail below. Only two aggregators are shown in FIG. 2 for the sake of simplicity.

In one implementation, each client system that wishes to use the verification infrastructure is loaded with a software package or internal system routines for convenient or even automatic communication and submission "upwards" of digital information. The software package may include some application program interface (API) 2014 that transforms submitted digital records into a proper form for processing. A digital record 2012 created, selected, or otherwise input in any way is then submitted by way of the API 2014 to a software module 2016 that uses the digital data from the record 2012 as at least one argument in a transformation function such as a hash function.

Cryptographic hash functions are well known in many areas of computer science and are therefore not described in greater detail here. Just one of many possible examples of a common class of hash functions that are suitable for use in this infrastructure is the "secure hash algorithm" (SHA) family.

Additional hashing, or an expanded input vector to include other parameters, within the client may be desired to include additional information depending on the design protocol of the infrastructure. Just a few of the many possible arguments the system designer might optionally choose to include as arguments of the additional hash function 2016 are an identifier of the person or entity requesting registration, an identifier of the particular client system being used, a time indication, information relating to the geographic location of the client or other system, or any other information desired to be incorporated as part of the registration request. In general, the signing infrastructure does not "care" what arguments are included in a given digital input record, or in what order, or according to what formatting protocol—whatever 1's and 0's are included in the data record may be hashed and signed as any other. The only requirement is that, upon attempted verification of a purportedly authentic or original data record, it should be presented for verification identically such that the argument(s) to the hashing function will produce the same output. A software module 2020 is preferably included to transmit the output of the transformation 2016 to higher layers of the infrastructure as a request (REQ), along with any other parameters and data necessary to communicate with a gateway and initiate the registration request.

It is assumed in this discussion that the transformation function 2016 is a hash function because this will be the most common and efficient design choice, and also because the properties of hash functions are so well understood; moreover, many different hash functions are used in the field of cryptology, security, etc., within commodity computers. One other advantageous property of hash functions is that they can reduce even large amounts of digital information to a size that is more easily processed, with a statistically insignificant chance of two different inputs leading to the same output. In other words, many well-known hash functions will be suitable for use throughout the infrastructure, and can be chosen using normal design considerations. Nonetheless, the function that transforms digital records into a form suitable for submission as a request need not be a hash function as long as its properties are known. For example, especially for small digital records, if the user does not care that "raw" data is being revealed, it may be more efficient simply to transmit the digital record data as is, in its entirety or some subset; in this case, the transformation function may simply be viewed as an identity function, which may then also append whatever other additional information is needed according to the core system administration to form a proper registration request.

The data structure of a binary hash tree is illustrated within the gateway 3010-2. The lowest level nodes of the gateway hash tree will correspond to the transformed dataset 2018 submitted as a request from a client, along with any other parameters or data used in any given implementation to form a request. As illustrated, the values represented by each pair of nodes in the data structure form inputs to a parent node, which then computes a combined output value, for example, as a hash of the two input values from its "children" nodes. Each thus combined output/hash value is then submitted "upward" as one of two inputs to a "grandparent" node, which in turn computes a combined output/hash value for these two inputs, and so on, until a single combined output/hash value is computed for the top node in the gateway.

Aggregators such as the system 4010-1 similarly include computation modules that compute combined output values for each node of a hash tree data structure. As in the gateways, the value computed for each node in the aggregator's data structure uses its two "children" nodes as inputs. Each aggregator will therefore ultimately compute an uppermost combined output value—a "root hash value"—as the result of application of a hash function that includes information derived from the digital input record(s) of every client that submitted a request to a gateway in the data structure under that aggregator. Although it is of course possible, the aggregator layer 4000 does not necessarily need to be controlled by the same system administrator that is in charge of the core layer 5000. In other words, as long as they are implemented according to the required protocols and use the correct hash functions (or whatever other type of function is chosen in a given implementation), then the client, gateway, and aggregation layers may be configured to use any type of architecture that various users prefer.

In many cases, the core 5000 is maintained and controlled by the overall system administrator. Within the core, a hash tree data structure is computed using the root hash values of the aggregators as lowest level inputs. In effect, the hash computations and structure within the core form an aggregation of aggregation values. The core will therefore ultimately compute a single current uppermost core hash value at the respective tree node 5001 at each calendar time interval t0, t1, ..., tn. This uppermost value is referred to herein alternatively as the "calendar value", "current calendar value" or "current period value" $C_i$ for the time interval $t_i$.

Note that the time origin and granularity are both design choices. For example, one might choose each time interval to be uniformly 1.0 seconds. On the other hand, if significant network delay is anticipated or detected, it may be preferable to set the calendar time interval to a greater value. Less frequent computation of calendar values might also be chosen to suit the administrative or other needs of a verification infrastructure implemented totally within a single enterprise or for any other reason.

Conversely, if there is some need for finer temporal granularity, then one could decrease the time interval such that calendar values are generated more frequently than once a second. System designers may choose an appropriate time granularity based on such factors as the anticipated processing load, network bandwidth and transmission rate, etc.

One advantage of having a precise and uniform calendar period, such as 1.0 seconds, is that there will then be a precise correspondence between time and calendar values. Each calendar value will then represent a time value as well, which will then also become information contained within each signature. The core 5000 therefore preferably includes or communicates with a precise time base, such as a precision clock, a low-latency connection to an external clock signal or time indication, etc.

Note that the uppermost tree node 5001 represents the root node of the entire tree structure of nodes junior to it. As is explained later, this will change upon recomputation of a new uppermost core hash value at the end of the next period of accumulating requests and generating signature vectors (also referred to as "data signatures") containing recomputation parameters.

In FIG. 2, certain ones of the hash tree nodes in the gateway 3010-2, the aggregator 4010-1, and the core 5000 are marked with an "X". Notice if one traverses the various tree paths upward from the value 2018 in the client 2010-1, it is possible to compute every value upward in the tree structures all the way to the most current uppermost core value 5001 given the values in the X-marked tree nodes (the siblings of the nodes in the direct recomputation path) and a knowledge of the hash functions applied at each successive parent node. In short, if a signature is associated with the digital record 2012 that includes all of the "X marked" values, and assuming predetermined hash functions (which may of course be the same or different functions), then re-computation of the hash values upward through all of the tree structures will yield the same value as in the current calendar value, but only if the starting input value representing the original digital record is in fact identical in every respect to the original. Even the slightest alteration to the digital input record or even a change of a single bit in any of the values of the signature associated with a record 2012 will lead to a re-computed calendar value that is not identical to the one in node 5001. Note also that each uppermost computed value in the core—the current calendar value—contains information derived from every digital input record that is input into the system during the current calendar time interval.

Figure 3:
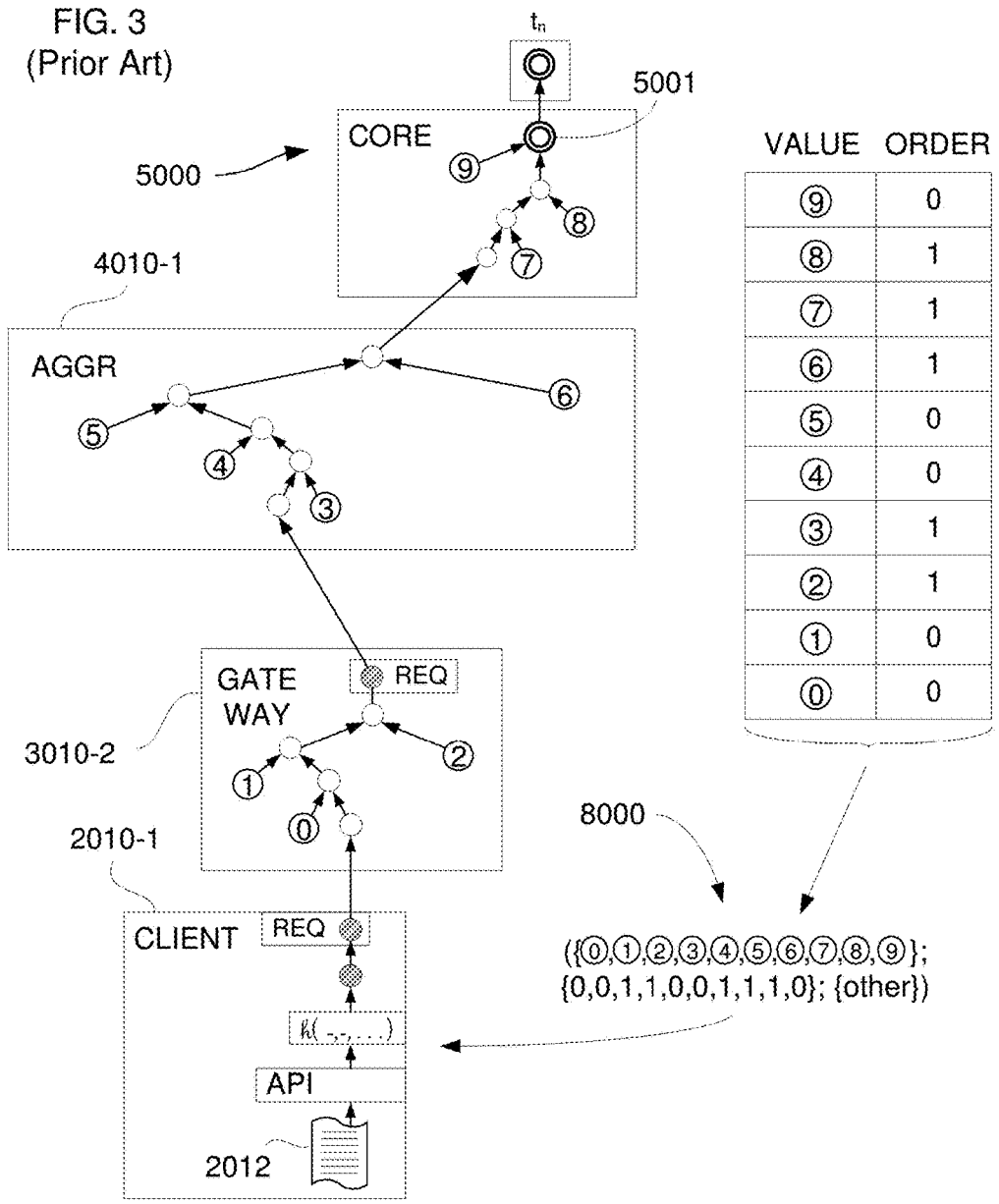
FIG. 3 shows a subset of FIG. 2 to illustrate a digital signature and recomputation of authentication values using the signature.

FIG. 3 illustrates a "reduced" infrastructure whose hash tree node values contain the information necessary to recompute the hash tree path all the way to the top of the system to the value in node 5001. It is not necessary for the recomputation to be carried out in any gateway, aggregator or the core; indeed, it is not even necessary for recomputation to take place within the same client 2010-1 that originally submitted the verification request for the digital record 2012. All that is necessary is the vector containing the "sibling" tree values at each level, as well as knowledge of which hash functions are used to compute each parent node. In other words, given this information, even a third-party would be able to perform the recomputation and compare with the node value 5001 and thereby either authenticate any given representation of what is supposed to be digital record 2012, or detect any difference.

In FIG. 3, the sibling hash values needed for recomputation are numbered 0-9. If order is important in the chosen hash function, then whether a sibling at each level is to the "right" or "left" in the hash structure will be relevant. In the example shown in FIG. 3, not only the value but also the order (0: from left, 1: from right) is therefore indicated in the vector ({sibling values 0-9},{order bits},{other}) returned along with any other chosen information (for example, the physical/clock time the current calendar value corresponds to) as the data signature 8000. At this point, one may see one advantage of using a binary hash tree structure: at each level, there will be only one sibling value needed for upward recomputation. Although a non-binary tree structure would be possible, one would then have to accept the increased computational, storage, and data-structural complexity. Comparing FIG. 2 and FIG. 3, one can also see that the computational burden to validate one of a set of N digital input records at any given time interval is proportional to only $\log_2 N$.

To increase independence of the various layers—in particular, clients and later entities wishing to perform authentication through recomputation—it is advantageous for the entire calendar to be passed to the aggregators and even to the lower layers, even as far as to clients, every time a new calendar value is computed, that is, at the end of each calendar time interval. This then allows delegation and distribution of the computational workload without any compromise of the integrity of the system. If the respective calendar value is passed down along with each data signature vector, it would therefore be possible to authenticate a digital record up to the level of the calendar value without any need for the infrastructure at all; rather, any user with the ability to compute hash values in the proper order, given the signature vector and respective calendar value, could authenticate a digital record presented as being identical to the original.

FIG. 1 shows a database or file (the "calendar") 6000 in the core that includes all calendar values either from some starting time, or, preferably, from the beginning of system time. In most practical implementations of the illustrated infrastructure, the collection of the present and past calendar values (in short, the "calendar") will quickly grow too large to transmit in whole from the core down to the aggregator(s) each time a new calendar value is computed, although this might be implemented in some cases where the time between calendar values is great enough relative to the available bandwidth. In most cases, however, it is neither practical nor even necessary to do so. Instead, it will typically be preferable to transmit to aggregator(s) only the latest calendar value, whereby each aggregator maintains its own complete calendar. Note that this has the side advantage that full calendars may be maintained in multiple locations. Whenever a new aggregator is added to the infrastructure, the core could then transmit a complete calendar at set-up time, complemented by new calendar values as they are computed. Indeed, calendars may be maintained at any level in the infrastructure. This allows new aggregators, gateways and clients to join the infrastructure with minimal administrative burden and enables recomputation and authentication of any digital record without having to involve levels higher than the entity wishing to authenticate the digital record.

In most implementations of the authentication infrastructure shown in FIG. 1, digital input records will come from many different sources, may be of different types, and may be input into client systems that are widely separated physically, feeding upward into different gateway servers. Given the nature of proper hash functions, a change of even one bit in one digital input record will lead to a calendar value that is underivable from what it would have been without the bit change. In practice, therefore, as long as even one digital input record is input into the infrastructure in a following interval, the calendar value will be completely unknowable beforehand.

See again FIG. 3. When the core computes the current calendar value 5001 at the new calendar time interval, it may return to aggregator 4010-1 its sibling (X-marked) lowest core node value from aggregator 4010-k, and the aggregator 4010-1 can then return downwards the X-marked hash values to the gateway 3010-2, which in turn can return downwards to the client 2010-1 all of the above, plus the X-marked hash values computed within that gateway's hash tree structure, etc. The data signature vector 8000 for each client can then be compiled for each data signature request (such as for each input record 2012), either in the client itself or in any entity (such as the associated gateway) that has all "sibling" values for a given input record.

Note that this arrangement makes it possible to distribute the hash computation infrastructure over various layers (vertically) and also "horizontally" at each layer, but the responsibility for communicating requests upward and partial or entire signature vectors downwards can also be distributed and can be carried out simultaneously in many different locations. Of course, since a data signature is unique to the digital record that led to it, the procedure for returning a signature vector for each input digital record 2012 for client 2010-1 (note that a single client may input more than one digital record for verification in each time interval) is preferably duplicated for all digital input records received in the time interval over which values were accumulated for the computation of node value 5001.

The configuration of the distributed infrastructure shown in FIG. 2 does not need to be static from one time interval to the next. Rather, each of the components below the core can be built asynchronously and independently of others; all that is needed for authenticating recomputation from a digital record up to the corresponding calendar value is the transformation function and other values that made up the original request, the vector of hash tree sibling values and knowledge of which hash functions are to be applied at each computation. Of course, the simplest case would be that the same hash function is used at every level. A somewhat more complicated choice would be to use the same hash function for all computations on a given level (within clients, within gateways, within aggregators, etc.) with variation between levels. Other even more complicated choices may of course be made as will be realized by those skilled in the art of such data structures and hash function computations. As long as the hash function used for each computation is known, the infrastructure will be able to validate a given input record.

In most cases, it is unlikely that the number of clients during a given computation interval will be exactly equal to a power of 2. Any known method may be used to adapt to the actual number of clients while still maintaining a binary hash tree structure throughout. As just one example of a solution to this, known dummy values may be used for all of the "missing" sibling node values. Alternatively, it is also possible to adjust the hash tree branches accordingly, in the manner of giving "byes" in single-elimination sports tournaments.

In one embodiment, the gateways 3000 may be more local to various clients whereas the aggregators are more regional. For example, it would be possible to locate aggregators in different parts of the world not only to distribute the workload, but also to increase throughput. Although it appears in FIGS. 1-3 that clients are associated with a particular gateway and gateways are associated with a particular aggregator, this is not necessary. Rather, client requests could be submitted over a network, and the first gateway that responds could then be associated with that client for that authentication transaction. Similarly, requests from gateways could be submitted to an open network and processed by whichever aggregator first establishes a connection. Locating aggregators and gateways both physically and logically in an efficient manner will therefore typically better distribute workload and reduce latency. This may not be desired in other implementations, however. For example, entities such as the government, defense contractors, or companies that wish to maintain strict security and tight control of the entire infrastructure could control and specify the relationship between all of the layers of the infrastructure, or any subset of these.

Assume now by way of example that some entity later wishes to verify that a digital record in question—a "candidate digital record"—is an identical copy of digital record 2012. Applying the same transformation function 2016 to the candidate digital record and recomputing upward using the corresponding data signature 8000, the entity should compute to the exact same calendar value that resulted from the original digital record's registration request. Note that it is not necessary to call to the signature infrastructure 500 in order to verify a candidate digital record, although it would be possible for the same system to be configured to recompute from a record to a given calendar value as a service; rather, as long as any entity has the digital signature vector 8000 and a digital record to be tested in the same form as it was originally, and knows how this was transformed (if at all) into the request REQ, that entity may perform validating recomputation independently.

In some implementations, this level of verification is sufficient. As one possible example, if the calendar is distributed to enough independent aggregators, then if one malicious actor were to tamper with some calendar value, this could be detected if some procedure is implemented to compare with other copies of the same calendar.

As another example, in some implementations, users may choose or be obligated to rely on the security of the administrator of the core. In particular, government entities might implement a system in which users must simply rely on the government administrators. In these cases, recomputation up to the corresponding calendar value may be considered sufficiently reliable authentication. In the context of this infrastructure, this can be viewed as "first-level" verification. One hypothetical example of where such a system might be implemented would be where a government agency requires companies, laboratories, etc. to submit a copy of its calendar to the government entity every time the company's system updates its calendar. The government would then be able to audit the company's records and verify the authenticity of any given digital record by recomputing up to the proper calendar value, which the government will have stored. In practice, this would amount to requiring the company to keep updated a "calendar audit trail" with the auditing entity (such as the government).

Even in other instances, as long as the highest level system administrator trusts its ability to securely store calendars, it could be satisfied that a candidate digital record is authentic if recomputation leads to the appropriate stored calendar value. In a sense, it would be the system administrator itself in such cases that is looking for proof of the authenticity of candidate digital records as opposed to clients or other third-party entities. Consequently, the system administrator could trust the security of the recomputation and calendar values to the same extent it trusts itself to maintain the calendar copies.

All but the last digital record requesting registration in a calendar time period will typically need to wait for all other requests in the calendar time interval to be processed before a calendar value will be available that will enable authenticating recomputation. If the calendar time interval is kept short enough, this delay may be acceptable. To increase the level of security during the delay, it would also be possible to implement an option, whenever a client submits an authentication registration request, to generate and return not only the data signature vector but also a key-based signed certificate, which may be issued by any higher layer system such as the current gateway, aggregator, or even core Note that this use of keys is a temporary and optional expedient to further increase the security of the infrastructure, but that, with the additional steps described below, keys (and the trust they require) can be dispensed with altogether without compromising security at all. Moreover, implementations of the disclosed keyless authentication infrastructure may include use of keys for purposes other than authentication of digital input records as such; for example, one might choose to include a key-based solution for verifying the identity of a user, separate from whatever data he might be trying to sign or authenticate.

Figure 4:
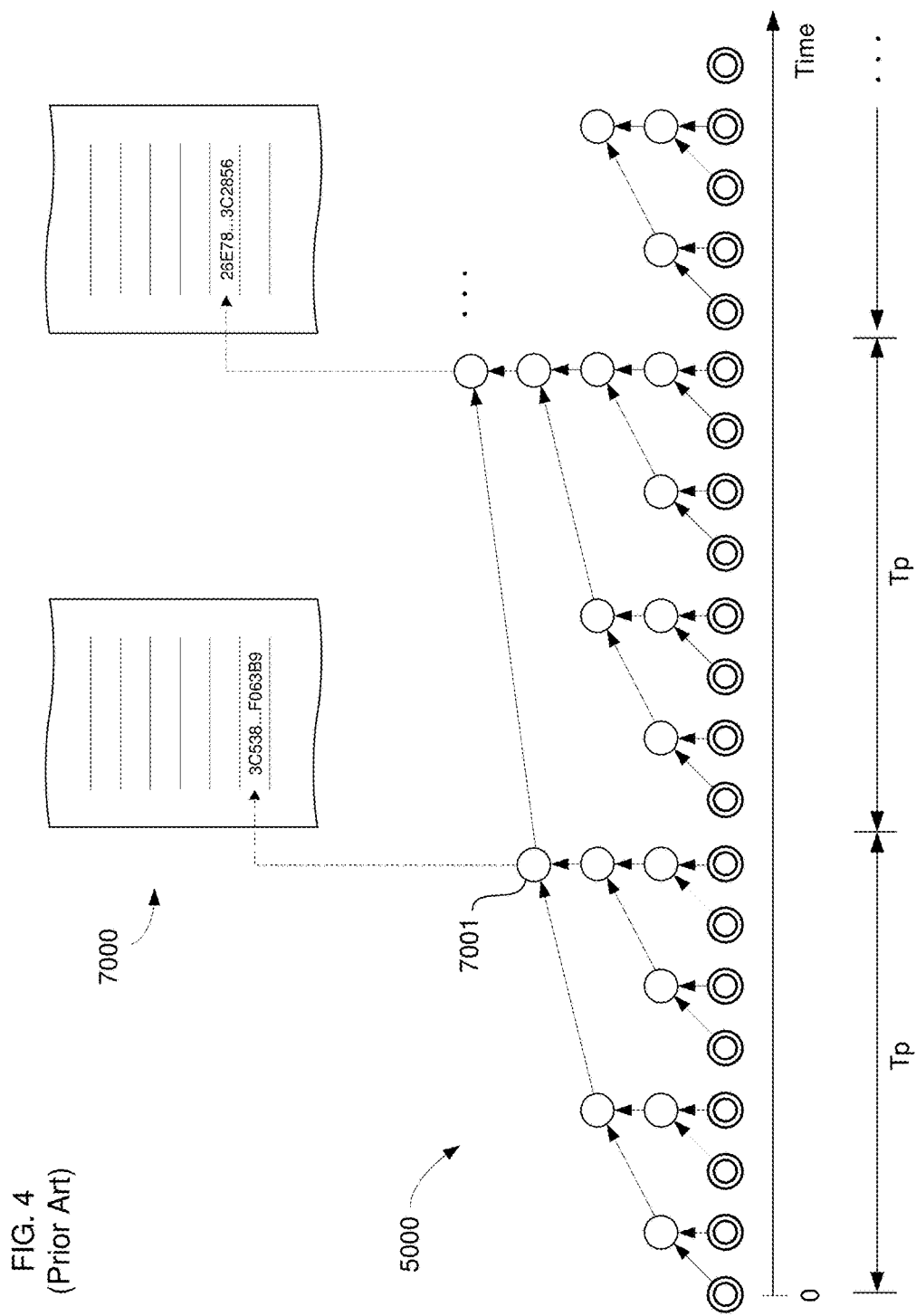
FIG. 4 illustrates publication to enable permanent, trust-free authentication.

FIG. 4 illustrates an extension of the basic calendar-reliant verification process that provides "second-level" verification that is a method for permanent verification with no need for keys or trust of any entity, not even the administrator of the core. In FIG. 4, all of the calendar values computed over a publication time interval Tp are themselves used as inputs to an additional hash tree structure that is preferably hashed together (for example, using a Merkle tree structure) with previous calendar values to compute a composite calendar value 7001 (a "publication value") that may then be submitted for publication in some medium 7000 such as a newspaper, online posting, database, blockchain (an embodiment described below), etc., that forms an unchangeable record of the composite calendar value. Here, the term "unchangeable" means that it would be practically impossible for even the most malicious actor—even if this is the core administrator—to alter every publicly available occurrence of the value. It is not necessary for "published" to be in any medium accessible to the general public, although this is of course one option that removes all need for a trusted authority; rather, a large or perhaps closed organization that implements the entire infrastructure on its own might simply choose to keep a database or journal of the composite calendar values in some secure logical or physical location.

Because of the various data structures and procedures of the distributed infrastructure, the published composite calendar value may encode information obtained from every input digital record over the entire publication time interval, and if the current calendar value for the current calendar period is hashed together with the previous one, which is hashed with the one before it, and so on, as shown in FIG. 4, then each published composite calendar value will encode information from every digital record ever submitted for registration from the beginning of calendar time at to. This guarantees the integrity of the entire system: Changing even a single bit in a single digital record registered in the past will cause a different publication value to be computed, which would then not match the actual publication value. Once the composite signature value is published (that is, the publication value), there is never again any need to temporarily associate any signed digital certificate (which might be provided as before to increase security until the composite value is published, at which point it will not be needed) with the signature vector of the corresponding digital input record; rather, using the data signature vector and the calendar values (which are advantageously stored in each of the aggregators), one can then recompute hash values upward from any digital input record all the way to the published value. If the digital input record used in such recomputation leads to a match with the published value, then one can be certain to within the degree of certainty of the hash functions themselves that the digital input record being tested is identical to the one that originally received the corresponding signature vector.

Figure 5:
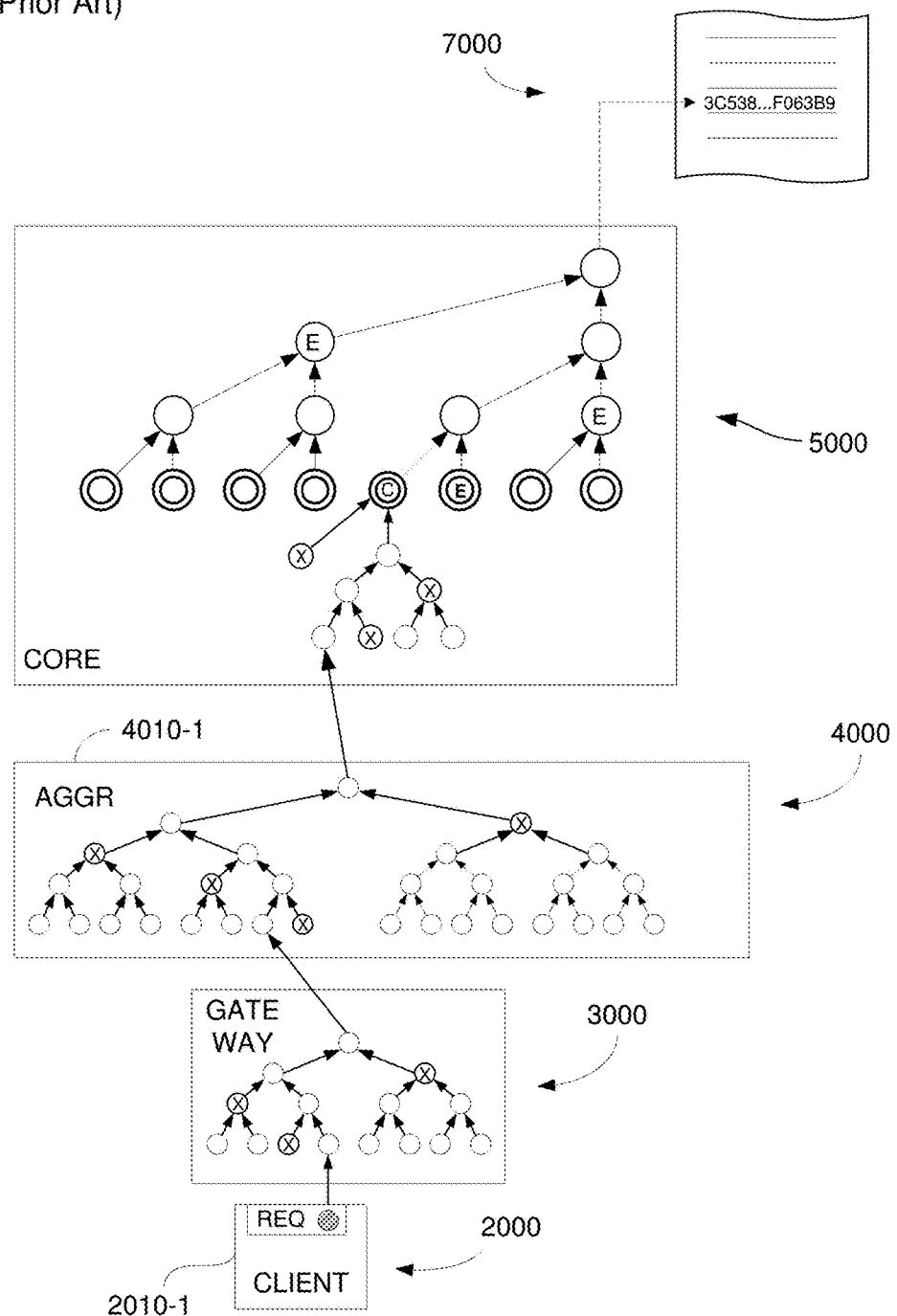
FIG. 5 illustrates use of a digital signature to enable system-independent authentication by recomputation.

FIG. 5 illustrates an optional extension of the signature vector to include the values obtained during computation of the publication value as well. Assume as before that the "X-marked" nodes are the sibling hash values for the digital record corresponding to the request REQ from client 2010-1. The X-marked values are sufficient to recompute the calendar value marked "C", but the hash values in the nodes marked "E" in the data structure (in FIG. 5, the Merkle tree structure) within the core that converts calendar values into the publication value are necessary to recompute all the way up to the published value 7000. Note that unless the current calendar value happens to be the last one in the current publication time interval Tp, then all of the sibling values in the core needed to recompute up to the published value will not yet be available when data signatures corresponding to the current calendar value are returned. The "extended sibling" values (illustrated as those marked with "E") may therefore be passed down to aggregators, and then further down through the different layers at the end of the publication time interval so that clients can complement their data signatures with the extended sibling values. At the end of the calendar period, the core thus preferably extends or augments the signature vectors to include the "E" values, along with corresponding order bits as previously. With such an extended signature, any party can verify the authenticity of a given digital record as long as it has the extended signature vector, knowledge of the hash (or other) functions used, and the corresponding publication value—if recomputation leads to a match, then the digital record must be identical to the original; if not, then something has been altered. Note also that any change of order in the time of receipt for any to digital input records will also affect the computed values in the core as well as the published composite signature value.

In FIG. 4, eight calendar values are shown in each publication time interval Tp. In other words, in the illustration, the number of calendar time intervals in each publication time interval Tp is conveniently a power of 2. This may not be so in other implementations, depending on the choice of intervals. For example, if a calendar value is generated each second, but publication occurs only once every week (604,800 seconds), then there will not be a power of 2 number of calendar values as leaf nodes of the Merkle tree structure. As in other trees, this can be handled in a known manner as in giving "byes" in single-elimination sports tournaments by adjusting the tree branches, by using "dummy" inputs, etc.

Although it may in many cases be desirable or even required for the published value to encode information from the entire calendar from the beginning of calendar time, other alternatives can also be implemented as long as suitable bookkeeping routines are included. For example, rather than include all calendar values in the Merkle tree, at each publication time all of the most recent calendar values could be included in the publication computation along with a random sampling of calendar values from previous intervals. This would be one way, for example, to ensure that the number of included calendar values is conveniently a power of 2.

Similarly, in some contexts, government authorities require proof of records extending back only for some given time such as three years. In such cases it might be advantageous always to include only calendar values generated during this required period such that only relevant digital records are encoded in the most recent publication value.

Another alternative would be for there to be only a single computation of the publication value, including all calendar values from the beginning of system time. This might be useful, for example, in projects with clear time or digital record limits. For example, in litigation or transactions, parties often submit digital records to a "data room" for easy exchange. Calendar values could then be generated periodically as in other cases (perhaps with a longer calendar time interval since digital records will generally not be submitted as frequently as in large-scale, universally accessible implementations of the infrastructure), but with only a single computation of a publication value when all parties agree to close the data room. The publication value would then be a form of "seal" on the body of submitted digital records, which could later be used for recomputation and verification of any digital record ever submitted into the data room.

It is not absolutely necessary for the publication value to be computed using the Merkle hash tree data structure illustrated in FIG. 4. One alternative might be, for example, that all calendar values over the publication time interval are concatenated and then hashed as a whole together with a pseudorandom number, which then becomes part of the extended data signature vectors. An embodiment is, moreover, described below in which a blockchain serves the function of the calendar and also serves the purpose of "publication" in an essentially unchangeable medium.

It is not a requirement for systems in any given layer to apply the same hash functions. For example, the transformation functions used in different client systems could be different. As long as the functions at each place in the recomputation path are known to whoever later wants to authenticate a digital record through recomputation, the authentication process will work properly. Adding a hash function identifier as an input parameter to the preparation of the registration request would be one convenient way to enable future users to correctly authenticate a digital record through recomputation.

Redundancy and Synchronization

In the infrastructure illustrated in, for example, FIG. 2, if the core system (typically, a server) 5000 or the network connection to the core were to fail, then it would not be possible to create data signatures as long as the failure persists, and even when the core came back "online" there would be a possibly unacceptable delay or at best administrative complications in getting data signatures for both the previous and the current periods' requests, assuming that the previous period's requests are serviced at all. Similarly, if no network connection is established between one of the aggregators and the core, then there would be no alternative and that aggregators' "childrens'" requests for data signatures could not be serviced.

Figure 6A:
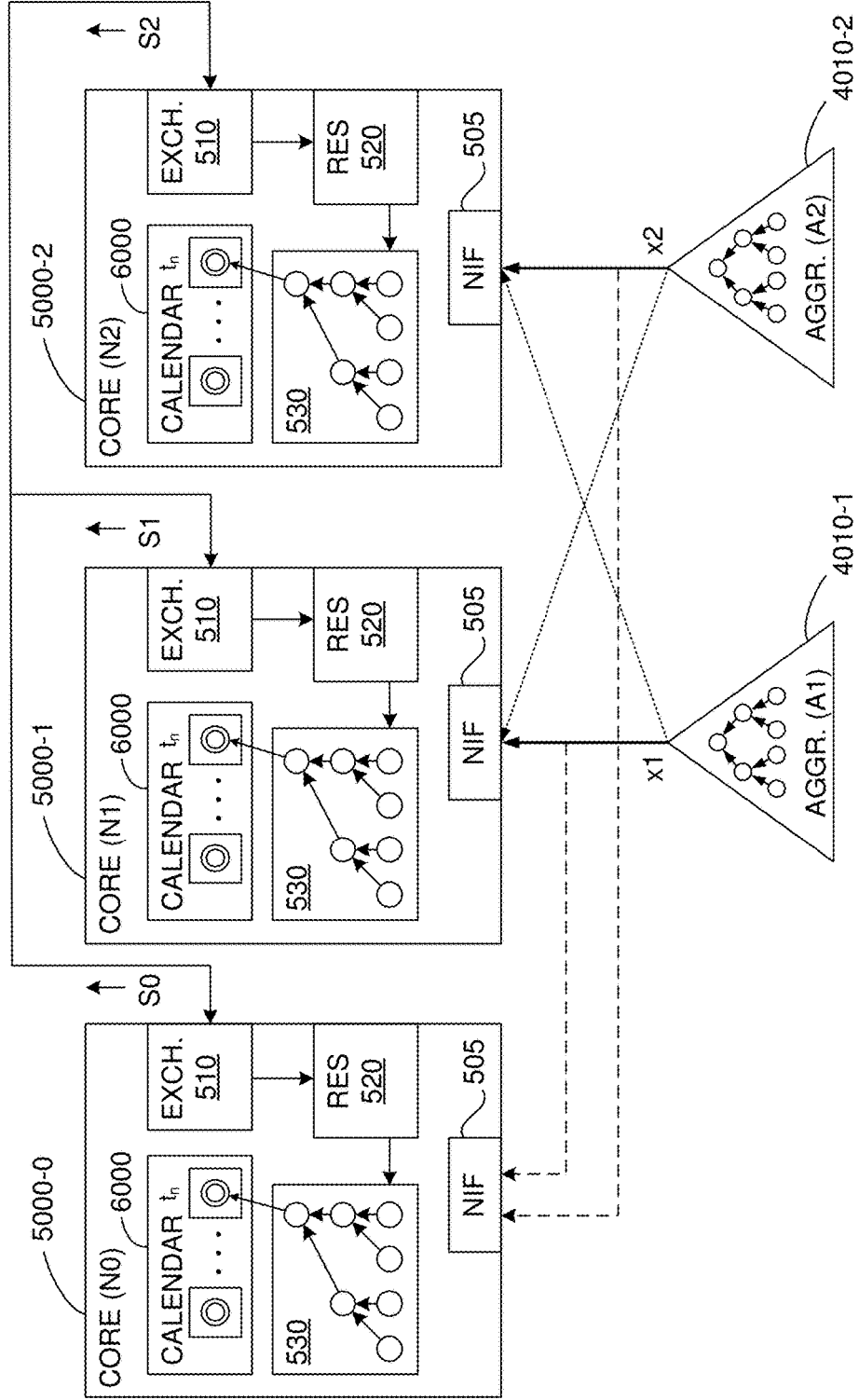
FIGS. 6A and 6B illustrate a novel method for resolving potential ambiguity in the results of highest level aggregation computations in a verification infrastructure with two aggregators.
Figure 6B:
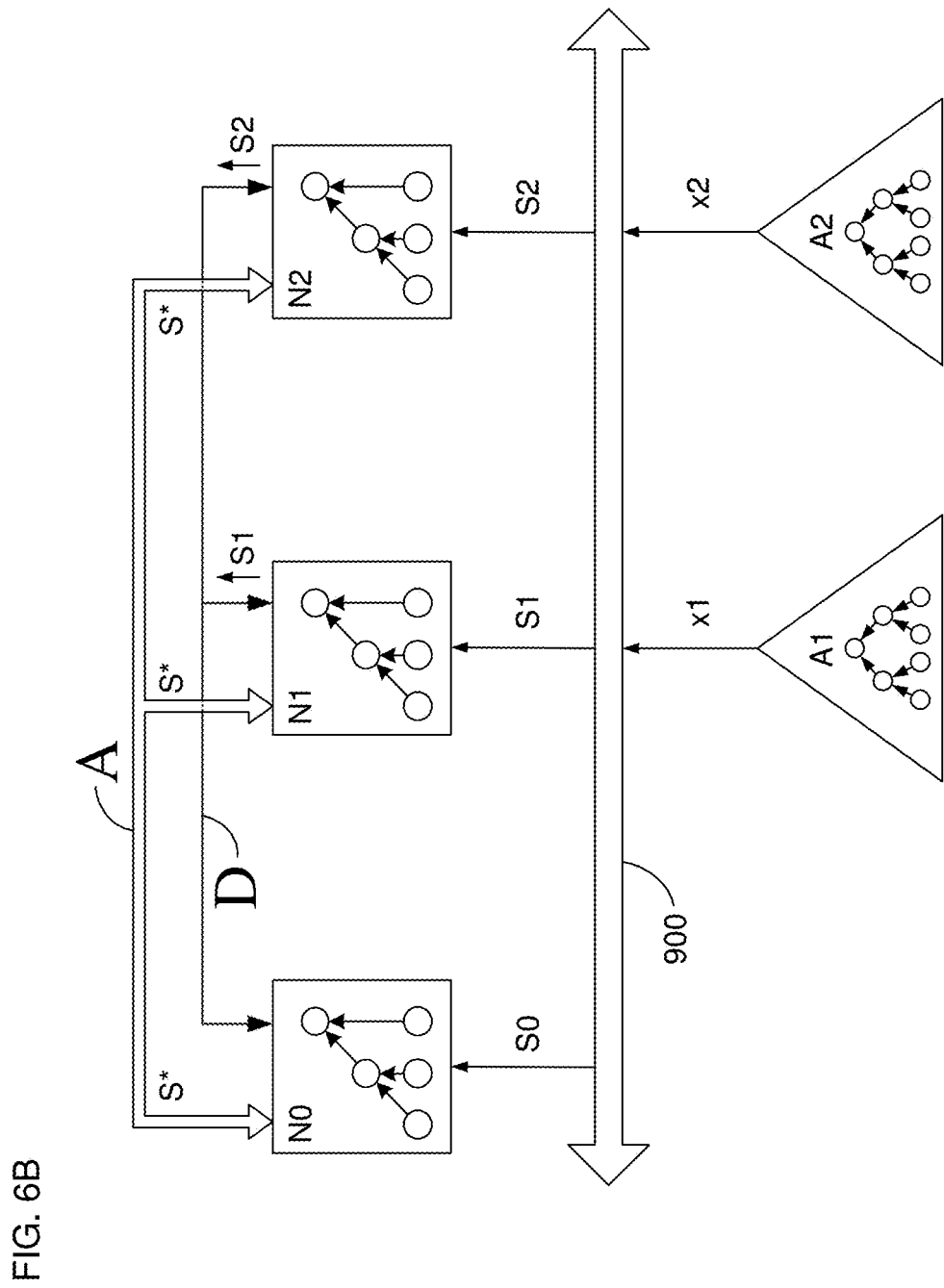

FIGS. 6A and 6B illustrate an embodiment of an authentication infrastructure that includes a plurality of core systems (or "core nodes") 5000-0, 5000-1, 5000-2, which, for convenience, are also labeled N0, N1, N2, respectively. In this embodiment, there are two highest level aggregators 4000-1, 4000-2 (also labeled A1, A2, respectively) that feed their respective uppermost hash values x1, x2 to N1, N2, respectively. In other words, the primary or "default" core for A1 is N1 and for A2 is N2. Since they are thus associated, aggregator Ai is referred to below as the "associate" or "associated aggregator" of node Ni. Although not necessary, this association may be because Ai and Ni have a network connection known to be fast and stable, for geographic preference, load balancing, or simply for administrative reasons, etc.; indeed, they could even be different processes running in the same computer. Each node Ni then attempts to communicate the corresponding hash value xi to all the other nodes. As a practical, alternative implementation, it would also be possible for the nodes simply first to exchange node IDs and then to fill in with each node's received xi values later, before final computation for the calendar round (such as a second).

As an alternative, however, it would be possible to configure the system such that each aggregator transmits its uppermost hash value to all (or as many as possible) nodes, whose receipt success or failure will appear in the subsequent exchanges of sets Si (see below). A different embodiment, described and illustrated below, provides yet another alternative embodiment.

Each core node will know which aggregator has issued a received request. In other words, core nodes will receive and be able to decode an identifier for each aggregator. There are many known ways to identify which server another server is communicating with, for example, by means of the aggregator's IP address, or with specific identifying information that the aggregator transmits along with each request. Another option is to include the respective aggregator's identifier along with its hash value xi.

Note that, although FIG. 6A shows separate lines of communication from the aggregators to the core nodes, in practice, a single network such as the Internet may be used for all such communication. Similarly, the core nodes N1, N2 may communicate over either the same network, such as the Internet, or possibly over a faster, proprietary or dedicated network. The only assumption is that aggregators will in the usual, non-failure case be able to communicate information to the core nodes and the core nodes, or at least certain exchange components described below, will be able to communicate with each other.

The notion of "failure" is not limited to inoperability of come component of the infrastructure, such as a server going "down" or a network connection being severed. In many embodiments of a signature infrastructure, there is some time period, such as calendar periods, during requests for digital signatures need to be "cut off", with subsequent requests falling in subsequent periods. In other words, there needs to be some "cut-off" so that the hash tree for a current round (period) can be established and an uppermost hash value calculated. Failure of a request from an aggregator to reach a core node in time (before the cut-off time for the current round), for example, because of network delay, is thus also a "failure" in the sense of embodiments of this invention, since its request will have arrived too late to be processed in the current round by at least one core node.

FIG. 6A illustrates some of the hardware and software components that will typically be included in each core node. Standard components such as one or more processors, memory, storage, an operating system and user-level applications, such as an administrative console application that allows a system administrator to access and monitor the various other components, will typically be included but are not shown in the figure merely for the sake of simplicity and because they are well-understood. Other standard hardware and software components of a server or similar computer system used to implement each core node are similarly not shown. FIG. 6A does show, however, that each core node N0, N1, N2 will include some form of network interface 505 (which may also be a standard hardware component with corresponding driver software), a computation module 530 for computing the internal hash tree that has the aggregators' uppermost hash values as inputs, and the calendar component 6000, which will typically be a data structure in storage or (preferably) non-volatile memory, along with code enabling computation and processing of the various values in the data structure. In this embodiment, each core node will also include an exchange module 510 and a resolution module 520, which will comprise bodies of computer processor-executable software whose functions are described below. All or some subset of the indicated components may be, but need not be, virtualized, and/or may be combined into a single software entity.

Now let Si be the set of uppermost hash values that core node Ni receives during a current calendar period. Si is thus the "local set" for Ni. In the illustrated embodiment, each core node could thus receive one of four different sets, namely:
 {x1}=only x1;
 {x2}=only x2;
 {x1, x2}=both x1 and x2; or
 {--} neither x1 nor x2.

Different conditions may have occurred to cause a core node not to receive one or both of the xi values from the aggregators A1, A2. Some of these conditions might be: the respective aggregator itself had a system failure; the aggregator's network connection failed; the message containing the xi value was corrupted in transmission, which may be determined in any known manner; the xi value was not communicated to the core node within a predetermined timeout period, such that it is too late to be included in the current calendar value computation; the network itself may have failed; the core node itself has failed in some way, either in its network connection (for example, the interface component 505) or in its ability to carry out the necessary computations and storage procedures (such as of the calendar).

In a single-core infrastructure, the decision about which upper-most aggregator's hash values to include in the computation of the current calendar value is straightforward: include whichever xi is received. In a multi-core infrastructure, however, different cores may receive different ones of the xi transmissions, so there must be some mechanism to resolve any ambiguities so that a current calendar value can be determined that is consistent across all the cores. In other words, there should be some mechanism to determine a final, global set of xi values given the various local sets, which may differ. The embodiments illustrated in FIGS. 6A and 6B provide for consistency in two main phases: Distribution and Agreement, labeled D and A in FIG. 6B.

In the figures, merely for the sake of clarity, the different exchange modules 510 and core nodes N1 are illustrated as if they have separate connections such as D and A in FIG. 6B or the connections between the exchange modules 510 in FIG. 6A, apart from the network 900. Although this would be possible, using a dedicated, possibly higher speed network connection, in most cases the core nodes will communicate with each other over the same network 900, via the same interface 505, as for any other type of network connection.

In the distribution phase, each core node Ni compiles and exchanges (via the respective exchange module 510) with all other core nodes (at least, all the others it can connect and communicate with at the moment) its set Si of aggregator Ai hash values xi that it has received. In other words, each node tells all the others what it "thinks" the input set of current uppermost aggregator hash values xi is. In the Agreement phase, if a minimum threshold number of core nodes successfully received at least one set Si, then the core nodes, in the resolution module 520, determine the majority view, which becomes the set S* used to compute the current calendar value. In this embodiment, the core node N0 is included to arbitrate any disagreement by providing another "vote" about the currently correct set Si.

If a core node is not in the majority, then it does not compute a calendar value itself and does not return to its associated "child" aggregator the set of recomputation values it would need to form proper digital signatures for its underlying inputs and signature requests; rather, assuming a core node consensus (the majority agree on the input set), then the "minority" core node receives the computed current calendar value from one of the majority nodes.

Each core node therefore may compile and maintain a complete and system-wide consistent calendar. In embodiments that include publication, as illustrated in FIGS. 4 and 5, each core node N1, N2, N3 may compute the publication value independently (since all have the same calendars), or the infrastructure could be designed so that the publication value is computed by one of the nodes and then distributed globally, if desired.

In the general case here, after the Distribution phase, the resolution modules determine what the "majority" view is. If at least two of the three core nodes agree, then that becomes the current set S* that all nodes use to compute a current calendar value, sending recomputation parameters to aggregators whose values were included in S* and sending error messages to any aggregator whose uppermost value x1 is not included in S*. Now consider some examples:

Example 1

The "ideal" case, which, in practice, is likely to be the most common case: Each aggregator A1, A2 successfully transmits its uppermost hash value x1, x2, respectively, to the three core nodes N0, N1, N2. Thus, S0=S1=S2={x1, x2}. Each core node will distribute its Si to the other two core nodes, and all the nodes' resolution modules 520 will then detect that there is unanimity, so that {x1, x2} are then, in the Agreement phase, distributed as the final set S*={x1, x2}. After storing S*, each core node can then, in the tree module 530, compute the current calendar value $t_n$ as usual and distribute recomputation parameters downward to its associated aggregator. If an aggregator doesn't receive an answer from "its" associated core node within a predetermined time-out period, then it may follow a failure protocol such as: query any of the other nodes, where failure to receive an answer from any node would indicate to that aggregator that its request could not be serviced for the current calendar period, such that it would either need to resubmit or simply return to its subordinate aggregators, gateways and/or clients an error message.

Example 2

The "worst" case: A majority of the core nodes fails to receive any request xi, such that at least two of S0, S1, and S2={-}. In this case, after the Distribution phase, all nodes will realize that it is not possible to return any answers to aggregators and when this failure becomes known (S*={-}) after the Agreement phase, the nodes will issue failure messages downward to the aggregators, which will then follow the failure protocol.

Example 3

S0={x1, x2}; S1={x1}; S2={x1, x2}. Here, both values x1, x2 reach at least two of the core nodes. A majority can therefore form the "consensus" that S*={x1, x2}, which is then sent to all the core nodes (including N1) in the Agreement phase. All the core nodes can therefore compute the same current $t_n$ calendar value from x1 and x2 as inputs. Note that all clients will still be able to receive digital signatures, since there is a consistent recomputation path to $t_n$ upward from each client to the calendar.

Example 4

S0={x1}; S1={x1}; S2={x1, x2}. The majority set here includes only one of the values x1, x2. In this example, S*={x1}, such that only x1 can be included in the computation of the current calendar value $t_n$. An error message must then be sent (for example, by N2) to A2, since the x2 value from its associated aggregator is not in the final set. Only clients below A1 in the infrastructure hierarchy will receive their requested digital signatures since only they will have a complete recomputation path to $t_n$.

Example 5

S0={x1, x2}; S1={x1}; S2={x2}. In this case, even though there is no majority that has the same set, the final set can still be computed. In this example, the final set is {x1, x2}, because both x1 and x2 are elements of two different majorities of the sets, that is, x1 is an element of S0={x1, x2} and S1={x1}, while x2 is an element of S0 and S2={x2}. If then N1 has all three sets, it is able to compute the final set S* and may answer to its clients.

Example 6

S0={x1, x2}; S1={x1, x2}; S2={-}. Here, there is again consensus that S*={x1, x2}, which can be used by all core nodes to compute the same $t_n$. Note that it will still be possible to service the requests for clients below A2, even though the connection to N2 may have been cut off or N2 has otherwise failed—as long as there is a recomputation path through some node's internal tree (which will be the same as what N2's internal tree would have been), then a proper data signature can still be formed. When N2 or the connection to N2 returns to proper functioning, it will still be able to store and maintain a complete and proper calendar 6000 after receiving all "missed" values from any of the other nodes, such as, for example, the arbitrator node N0.

Example 8

S0={-}; S1={x1, x2}; S2={-}. This is a variant of the "worst" case, in that there is no majority consensus at all, such that all aggregators receive error messages.

Example 9

S0={x1, x2}; S1={x1, x2}; S2={-}. Here, N1 is able to decide that the final set is S*={x1, x2}, even if S2 is unknown.

Example 10

S0={x2}; S1={x1, x2}; S2={x1}. Here, N1 is not able to decide what the final set S* is. If S2={x2}, then the final set should would be S*={x2} and if S2={x1, x2}, the final set S* should be {x1, x2}. But in the given case, N1 does not know S2, so it will be impossible for N1 to decide what S* is. In this case, N1 should not answer to its clients and should follow whatever recovery protocol is established for such cases, at least for that second.

Note that other cases will be variants of the ones given above (switching x1 and x2, or switching node indices, for example) or can be resolved using the general rule of majority consensus.

Figure 7:
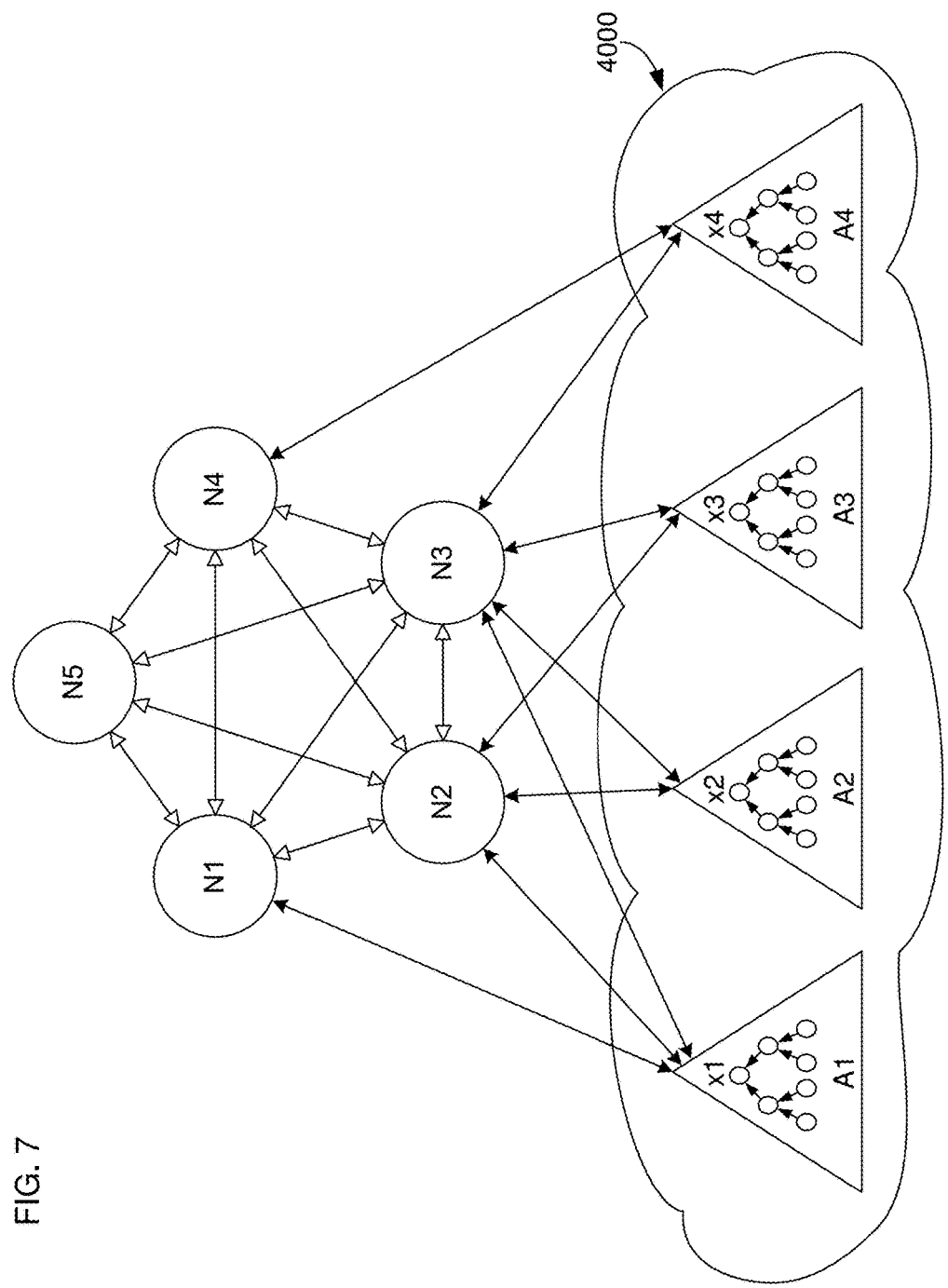
FIG. 7 illustrates an extension of the resolution system and method in the case of several upper-level aggregators.

FIG. 7 illustrates an infrastructure in which a number k of aggregators submit upper-level hash values to n core nodes, where k>2 and n≥k. In the case shown, k=4 and n=5, although this is just one example; the relationship between k and n need not be as shown. In the illustrated embodiment, different ones of the aggregators A1-A4 are connected with different ones of the nodes. Thus, A1 is communicating its uppermost hash value x1 to nodes N1, N2, and N3; A2 is communicating x2 to nodes N2 and N3; A3 is also communicating x3 to nodes N2 and N3; and A4 is communicating x4 to nodes N3 and N4. This is of course just one example; in the nominal, non-failure case, each aggregator Ai may communicate its uppermost value xi to all of the nodes N1-N4, each of which, in turn, communicates with all the other nodes, as well as with a fifth node N5, which is not shown as receiving inputs directly from any of the aggregators.

As before, each aggregator A1-A4 may be uniquely associated with a respective one of the nodes N1-N4, for example, because it is a process running in that node, that is, running at the same location and/on the same hardware platform, because it has a network connection known to be particularly reliable and fast, for reasons of network administration, or for any other reason. In such an embodiment, each node Ni could be considered to include its associated aggregator Ai. It is also possible for a given aggregator Ai to be able to communicate only with its node Ni, whereby nodes exchange their xi values among themselves such that other nodes Nj learn of the value xi, if at all, only from node Ni ($j \neq i$) in an inter-node exchange phase; that may be referred to as "fixed" association.

It would also be possible, however, for aggregators not to have a fixed association with any particular node, whereby each aggregator Ai at least attempts to communicate its value xi to all, or to some selected ones, of the nodes; this may be referred to as "non-fixed" association. In such case, inter-node exchange of xi values may not be necessary, or may be carried out as a secondary, confirmative or back-up step.

Each of the nodes may have two different roles depending on whether it services requests from associates (aggregators) or not. If a node doesn't receive a associate request, then that node may assume a supporting role and function as backup storage for other core nodes. These roles are not necessarily fixed, but rather may change from period (such as 1 s) to period depending on whether a given node receives requests.

There are two major phases during each synchronization round: compilation by each node Ni of the set of root hash values xi it believes to have been received as a result of received associate requests; and convergence on a final common set of root hash values that will form the next calendar value.

As for compilation, as mentioned above, there are different possible implementations: In one, each node Ni may directly receive only xi from an associated aggregator Ai, after which Ni exchanges its xi value with other nodes Nj ($j \neq i$). In another, aggregators transmit, or at least attempt to transmit, their hash values x to one or more, or all of the nodes, each of which then compiles its set Si of what it thinks is the complete set of x values. Yet another embodiment could combine these compilation methods, with each node receiving xi values from multiple aggregators, compiling its received values, and then also communicating to other nodes which xi values it has received. (Note that, at least initially, it may suffice for nodes to exchange with each other only some form of identifier of the aggregator(s) for which it has received xi values.) The choice of compilation method will in many cases be a design choice, depending on how the aggregators are architected (within or separate from node servers, for example), network latency, etc.

Assume, by way of example only, the embodiment in which each aggregator Ai directly communicates its root hash value xi only to a single, associated node Ni, after which each node attempts to communicate to the other nodes whether it has received its xi value. After the compilation phase (even in the embodiments in which aggregators communicate their hash values to more than one node), each node Ni will thus have a respective set Si of hash values xi that it thinks aggregators have transmitted in conjunction with signature requests.

In the less than ideal case, that is, when at least one node fails to receive (either directly and/or after inter-node exchange) one or more of the top-level hash values xi from the aggregators Ai, the various nodes must in some way reconcile their different conceptions (sets Si) about which xi values to include in the calculation of the final hash value, that is, the current calendar value.

The general procedure for resolving failures in communication of upper-level hash values xi from aggregators to the nodes is analogous to the two-aggregator embodiment described above, but in this more general case simple majority voting is modified to take into account the increased number of possible failure combinations. There should be sufficient replication in real time before the nodes can commit to an authoritative answer about what the final set S* of upper-level values xi is.

As will be explained and illustrated in greater detail below, at the end of each round, nodes will be able to respond in one of three ways:

1) at least some node will be able to respond to one or more given aggregator(s) Ai with the top-level hash value, that is, the current calendar value, as well as with the recomputation parameters allowing for recomputation from the aggregator's hash value to the calendar value. In other words, the node provides to the aggregator(s) the complete path up to the calendar value, since the nodes in this case share an agreed-on path to the calendar value. In fixed-association embodiments, the closed form (directly closed) will return path values from Ai only through its fixed-associated node Ni; in an embodiment with non-fixed aggregator-node association, the closed form (indirectly closed) returns path values from the aggregator's Ai hash value xi to the calendar value through some node (Ni or other Nj). These response forms are referred to here as a "closed" round/second/calendar period, since the nodes will have all the information necessary to provide recomputation information for the aggregators;

2) there is no agreed-on path to the calendar value, but the node Ni is able to pass down to Ai at least its set Si, which may be updated in a following round as more information becomes available in following rounds, allowing recomputation up to some calendar value. Since the process is incomplete, pending, such a round is referred to here as an "open" round, and the node's response is in "open form"; or 3) node Ni is not able to pass down even a non-empty set Si, in which case Ni will issue an error message, or the aggregator assumes such an error.

In this embodiment, all nodes N1-N4 announce their received aggregate root hash values, that is, their respective sets Si, to all other nodes and expect to receive confirmations that provide the confidence of sufficient copy redundancy. If sufficient replication cannot be ensured, the node drops the request and responds with an error.

Behavior of each node is defined by a global "resolution threshold" parameter $\tau$. By common rule, a given root hash value xi must be successfully received and stored in at least $\tau$ number of other nodes before the aggregator Ai associated with node Ni gets a positive response. Instead of each node confirming each individual root-hash value xi received, which is an option, the hash announcements are preferably gathered and are announced as a list of nodes whose root hash value has been seen by all others. This acts as a confirmation of receipt and storage and also indicates which values each node commits for calendar entry formation.

Assume for the moment fixed aggregator-node association. Formally, node Nk responds to its associated aggregator in given round only if:

(1) Nk has received requests and has determined xk; and (2) Nk has received acknowledgements from at least τ other nodes confirming their storage of xk and the set Sk.

If either condition is not satisfied, then Nk should not respond with any acknowledgement of queries from other nodes and will be of no further relevance to the calendar (though, it may still get included to the calendar). In this context, that a node "answers" another node means that, during synchronization, it communicates the set of root hash values xi that it has received from the querying node. Each node thus answers when it has confirmation that its xk has sufficient number of backups and will be hashed into the tree structure within the core and thereby form part of the current calendar value.

As mentioned above, embodiments may accept the indirectly closed form, such that aggregator Ai receives recomputation parameters, that is, the path values from its own xi value up to the current calendar value, even if its associated node never received xi from Ai: As long as enough other nodes received xi, such that xi is included in the final set S*, then there will be a path through some node, even if not Ni, that computes to the calendar value. Note that recomputation does not assume that the nodes are actually functioning at the time of verifying some input record using a digital signature: Once an aggregator, or a client, has the recomputation parameters, that is, tree path sibling values, and the corresponding calendar value (or even publication value), then it is possible to perform all necessary verifying computations independently.

As before, let Sj be the set of xi values that node Nj has received. The collection of all received sets are then analyzed by each node to determine if the final set S* that is the unique common set of all root hash values contributing to the next calendar entry can be established.

Two modes allow for forming an answer to a node's associated associate aggregator, depending on how complete the information is about other nodes: A synchronized mode, and an unsynchronized mode.

In the synchronized mode, there is sufficient information to decide which nodes' xi values to include in the calculation of the final value of a calendar entry and which xi value(s) have been excluded.

Node Nk is synchronized if both:

(1) Nk has sufficient information to compute the final set S*; and (2) Nk has all hash values of the computed final set S*.

Node Nk can compute the final set S* if, for every Ni, either:

(1) Nk has τ+1 sets (including Sk) that contain xi; or (2) Nk has n–τ sets (including Sk) that do not contain xi, where n is the total number of nodes.

In other words, each node knows for every other node whether its root hash value has at least the resolution threshold number of copies or that this is a clearly excluded possibility. This determines whether each node's root hash xi will be included in the final set S* and contribute to the current calendar entry or it will be omitted. To compute the final root hash value, all the hash values of the members of the final set S* are required.

In the unsynchronized mode, when the conditions above are not satisfied (even if for single node), then the node has insufficient information to know exactly which xi values are to be used to compute the final root hash value. Whereas in the synchronized mode, the final set S* is known and the answer is a hash chain for xi, for example, in a Merkle (or similar canonical) tree, formed from hash values of the final set, in the unsynchronized mode the answer is the set of hash values themselves. This is so because if a different set will be agreed on by the synchronized nodes, the responses issued by any unsynchronized node will still contain sufficient information to build a proper hash chain. In short, a node is synchronized when there is no uncertainty about which xi will go into calendar.

A round of information is considered complete (that is, will satisfy the Completeness Condition) at node Nk if:

(1) Nk has sufficient information to compute the final root hash; and (2) Nk has sufficient information to decide the format of the round.

Nk can decide the format of the round if, for every node Ni whose xi value is in the final set S*, Nk has the corresponding Si.

A node's information is complete when the node is synchronized and certain that every node's answer has all xi of the Final Set S*. Examples of different scenarios follow to illustrate determination of synchronization and completeness:

Suppose first that n=5 (five nodes N1, N2, . . . , N5 as illustrated in FIG. 7) and τ=2;

Example 1

Suppose that N1 has (S1), or has received (S2-S4), the following sets:

S1={x1, x2, x3, x5}
S2={x1, x2, x3}
S3={x1, x2, x3}
S4={x1, x2}
S5=not received

N1 can compute final set S* (synchronized condition 1) because:

x1, x2, and x3 are all included in more than τ of the sets, and are therefore elements of the final set S*;

x4 is missing altogether from all received sets, and x5 are missing from at least three (n-τ) of the received sets, and are therefore excluded from S* N1 therefore has 100% certainty that the final set will be S={x1, x2, x3}.

N1 can compute the final root hash because N1 already has all hash values that are elements of S*, that is, all of x1, x2, and x3: S* is a subset (in this case, proper subset) of S1 (S*⊂S1).

N1 decides that this round (calendar period) is directly closed. S* is a subset of both S2 and S3. S⊆S2 and S*⊆S3. S* is therefore, in this case, a subset of every set Si for which xi is a member of S*. N1 is therefore synchronized and also satisfies the Completeness Condition.

Example 2

Suppose N1 has (S1), or has received (S2-S4), the following sets:

S1={x1, x3, x5}
S2={x1, x2, x3}
S3={x1, x2, x3}
S4={x1, x2}
S5=not received

N1 can compute final set S* (synchronized condition 1) because:

x1, x2, and x3 are all included in more than τ of the sets, and are therefore elements of the final set S*;

x4 is missing altogether from all received sets, and x5 is missing from at least three (n-τ) of the received sets;

both x4 and x5 are therefore excluded from S*. N1 therefore again can determine that the final set S*={x1, x2, x3}

However, N1 cannot on its own compute the final root hash because N1 did not itself successfully receive x2 from A2, (S* is not a subset of S1).

Hence, if N1 answers to its associate aggregator, the answer must be in the "open" form (such that it returns only its set S1) and N1 knows that this round must also be open in the final calendar database. N1 therefore is not synchronized and does not satisfy Completeness Condition. Alternatively, the system could be configured, in cases such as this, to respond to A1 in the indirectly closed form, with a recomputation path through N2 or N3, both of whose sets S2, S3 include all the values of the final set S*, including x2.

Example 3

Suppose N1 has, or has received, the following sets:
S1={x1, x2, x3, x5}
S2={x1, x2, x3}
S3={x1, x3}
S4={x1, x2}
S5=not received
N1 can compute S* (synchronized condition 1) because:
x1, x2, and x3 are all included in more than τ of the sets, and are therefore elements of the final set S*;
x4 and x5 are missing from at least three (n-τ) of the sets, and are therefore excluded from S*.
N1 therefore knows that final set S*={x1, x2, x3}

N1 can on its own compute the root hash value because N1 has all the elements of S*, that is, all of x1, x2, and x3. N1 can therefore answer requests in the closed form because N1 is synchronized.

However, N1 does not know whether that second will be closed in the calendar, because x3 is an element of S*, but S3 does not include all the elements of S* (it is missing x2). The round in the calendar database can be stored closed only if it later turns out that P3 did not answer to its associates. Again, depending on the implementation, an indirectly closed response could be returned to S3. N1 is therefore synchronized but does not satisfy the Completeness Condition.

Example 4

Suppose N1 has the following sets:
S1={x1, x2, x3}
S2={x1, x2, x3}
S3=not received
S4={x1, x3, x4}
S5={x1, x2, x5}
N1 can compute S* because:
x1, x2, and x3 are all included in more than τ of the sets, and are therefore elements of the final set S*;
x4 and x5 are missing from at least three (n-τ) of the received sets, and are therefore excluded from S*.
N1 therefore again can determine that the final set S*={x1, x2, x3}

N1 can compute the final root hash because N1 already has all hash values that are elements of S*. N1 is synchronized.

However, N1 does not know whether the round will be closed in the calendar, because x3 is an element of S*, but N1 has not received S3 and hence cannot decide whether S* is a subset of S3. N1 is synchronized but does not satisfy Completeness Condition.

Aggregation Request Handling and Root Hash Computation

At the end of each aggregation period each node calculates its root hash X ($t_n$ in FIGS. 1-3). Each node that has determined the final, global set S* may then compute the final root hash value from all the hash values xi that are members of the final set S*. Note that all of the synchronized nodes can unambiguously compute the same X, since they will construct the same internal hash tree (such as Merkle) based on the same set S* of hash values. Any of these nodes can then answer any of the associate aggregators whose upper level hash values xi are included in S.

Figure 10:
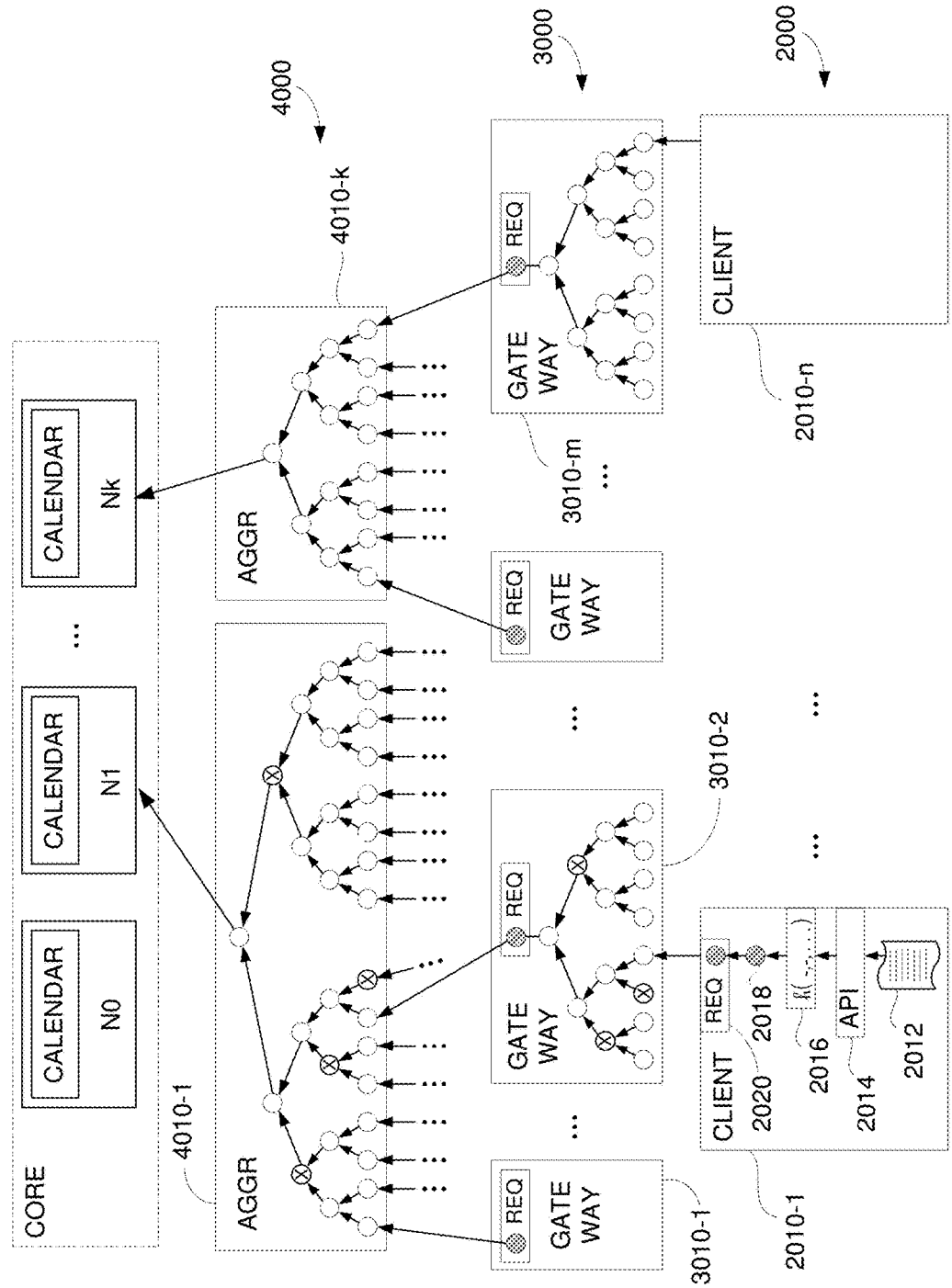
FIG. 10 shows the main hardware and software components of the verification and resolution system.

Each node should have and maintain a local copy of the calendar, which will gain one entry per period, such as each second. FIG. 10 thus illustrates the calendar as being in each of the nodes N0, . . . , Nk, and also illustrates that, both conceptually and as a matter of practical interaction, that the different nodes may be considered to form a single core. An entry may be in one of four states: 1) missing; 2) incomplete; 3) complete (open); and 4) complete (closed).

If a node has not been able to compute the calendar entry at all (missing), then it will return an error message to its associate, which may then, if its hash value xi is in the complete final set S*, get the recomputation values up to X from one of the other nodes that was able to compute X.

Incomplete entries may occur in unsynchronized mode as a result of network connectivity issues. Newer entries may be received after a downtime as synchronized and complete but until then the incomplete entries are preferably temporarily stored to avoid rewriting of the node's final calendar database. Its final calendar database may then be appended with completed information when available in a recovery phase. An incomplete entry can be completed as soon as updated information satisfies Completeness Condition. The updated entry can then be moved to final database so that the node has an up-to-date calendar copy.

Completed database entries may store information in two forms: When the Final Set may be collapsed to a chain (closed round), that is, the set of recomputation (tree sibling) values leading from the associated aggregator up to the current calendar value, and when it cannot (open round). When it is possible to collapse the Final Set into the Merkle tree and compute a calendar value, the completed entry stores the following: 1) Final root hash value–the computed root of the Merkle tree from hash values xi that were committed to the calendar; and 2) Final Set S*, preferably including node id's whose hash values xi were committed to the calendar.

When the node is not able to collapse the Final Set to a hash tree such as a Merkle tree (that is, it is a open second), the completed entry may store the following information: 1) the set of all hash values it has, with one root hash value xi (or a null value, if it was not received) for each node Ni; and 2) the Final Set S*, preferably including node id's whose hash values xi were committed to the calendar.

The calendar, with the most recent root hash value, may be distributed to aggregators in real time, or according to a recovery protocol. When the current entry is as yet incomplete, however, the entry may be stored in temporarily until recovered.

A recovery protocol may be used by the core nodes to retrieve information for incomplete and missing calendar entries. A node Nx that has unsynchronized hash values may send a "round information request" to any other node, which may then answer with a message that contains all the root hash values xi that other node has, together with all the local sets Sj that it has, including its own local set. The round information request may contain a round number k in which the missing or incomplete item occurred. After communicating with the respective node, the aggregator may then update its k-th item by combining the information in the response with the information it already has. After combining the information, the aggregator may then again check for the completeness condition of the entry and update the status of the entry until it is complete.

Figure 8:
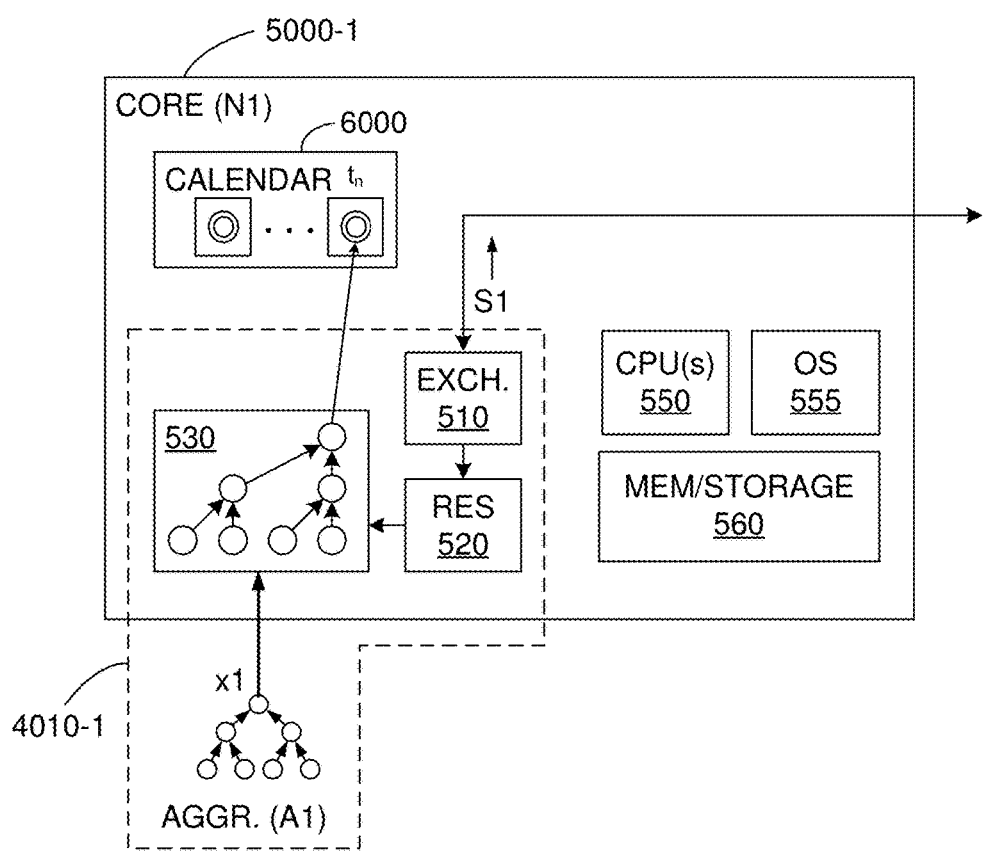
FIG. 8 illustrates the logical relationship of certain components in the resolution system.

As FIG. 8 illustrates, with respect to the various synchronization procedures described above, the logical separation between the core nodes and the highest level aggregators is not hard and fast. Indeed, given that each aggregator preferably is associated with a core node, the components 510, 520, 530 within the core that exchange information (such as the respective xi values, or local sets Si, or both) with other nodes, resolve any conflicts in the sets Si, and compute the final hash tree if possible, may be considered to be an extension of aggregation within the core itself, as indicated by the dashed line.

FIG. 8 also shows that each node will include one or more CPUs or CPU cores 550, as well as system-level software, such as an operating system (OS) 555 or similar software layer responsible for coordinating and mediating access to hardware resources. Some form of memory/storage devices 560 such as RAM, flash memory, disks, etc., which may be local and/or remote (in the "cloud") will also be included, typically both volatile and non-volatile, as well as transitory and non-transitory, to store the processor-executable instructions that comprise the various components 510, 520, 530, as well and the data and managing code associated with the calendar 6000. This code may be provided in the form of a non-transitory, computer program product, embodied using any medium, both physical and downloadable (which of course will be stored on some physical medium as well).

One of the advantages of the configuration shown in FIG. 7, in which a node is associated with each aggregator, is that no node forms a single point of failure when it comes to forming a proper calendar value during a given calendar period. This is true even if the connection between an aggregator Aj and its associated node Nj were to fail. Nonetheless, as FIG. 9 illustrates, it would be possible to implement the different procedures described above with a single node being associated with more than one aggregator (Am, An), with the different components 510, 520, 530 being with replicated, or each implemented as single components that perform the functions for all the node's associated aggregators.

Figure 9:
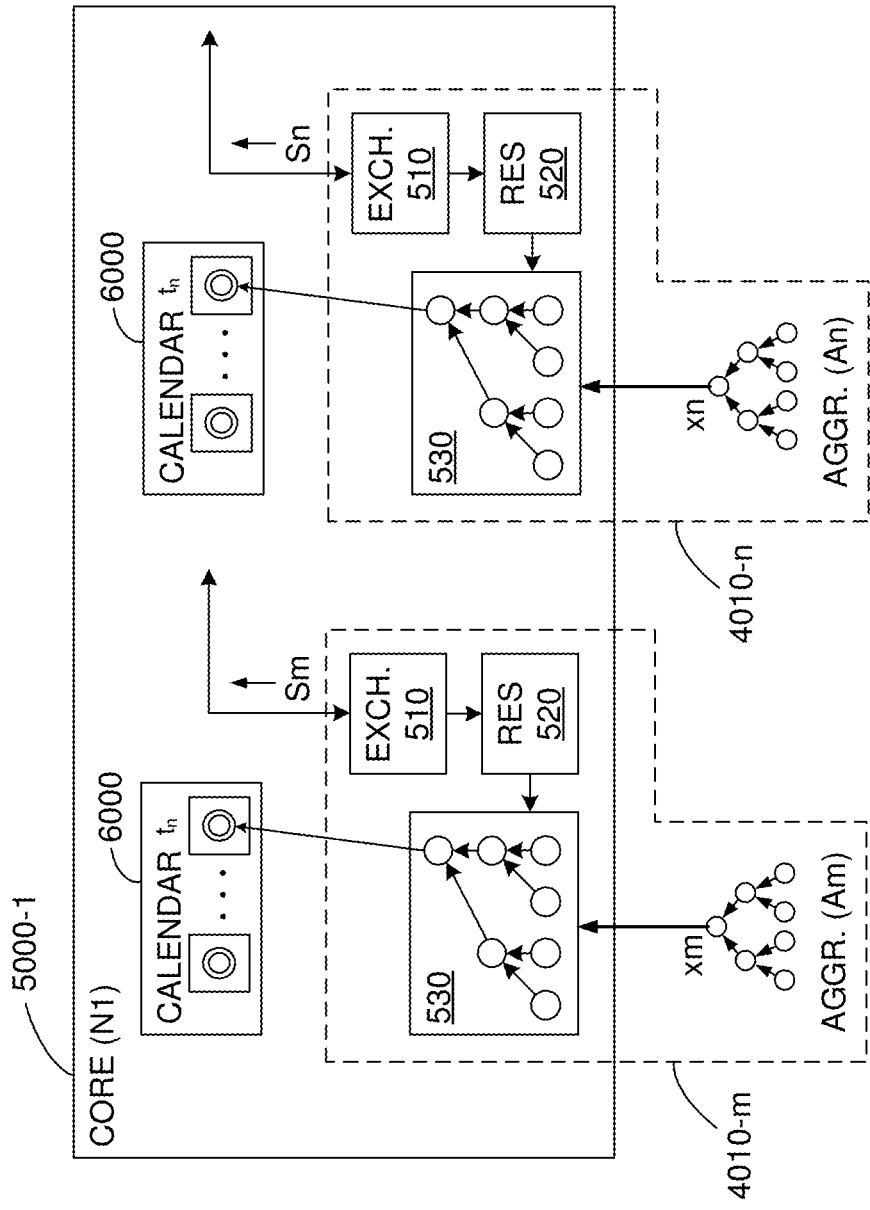
FIG. 9 illustrates the use of a single highest level core node to handle and resolve potentially ambiguous upper level values from more than one aggregator.

In the description of the multi-node embodiment shown in FIGS. 7-9, each node's local set Si is given equal consideration in the determination of the final set. In other words, the threshold τ above takes into consideration only how many nodes' sets Si a given hash value xi is in. It would also be possible to give different weights to the "votes" of different nodes. For example, if one of the nodes Nj is known to have especially reliable and fast network connection to several aggregators, then the elements in its set Sj could be weighted more than the elements in a set reported by, for example, a node running in a server known to have connectivity problems.

It may also happen that one of the nodes Nd becomes disabled and inoperable at least for some number of calendar periods and not be able to communicate even with other nodes. Rather than simply returning repeated error messages to the associate aggregator Ad of Nd, the infrastructure could re-associate An with a different node Ne. Ne could then treat Ad as it treats its own associate Ae, in effect acting itself as two different nodes. Until Nd comes back online, this arrangement could continue, with Ne counting, in effect, as two "votes" in the determination of the final set S*.

In the illustrated embodiments, the uppermost hash values xi of aggregators Ai are communicated (either directly from each aggregator to multiple nodes, or, given a one-to-one correspondence between aggregators and nodes, indirectly, via exchange among the nodes) to a plurality of nodes, which then resolve (if possible) disagreement as to which xi values are to be included in the final set S*. This arrangement could in some systems also, or instead, be implemented at lower levels of the signature infrastructure. For example, a group of gateways could communicate their uppermost hash values to a plurality of aggregators, which then exchange these values, resolve any disagreement about the gateway values, and incorporate in their own internal hash sub-trees the agreed-upon set of the gateways' uppermost hash values.

In the embodiments illustrated above, the aggregators are at the top (other than the nodes) of a distributed hash-tree infrastructure designed to create digital signatures that can be used to authenticate different sets of data. The methods described above for a group of servers to resolve possible differences in perceived inputs to arrive at an agreed-upon final set of such inputs for a given accumulation/aggregation period may be used in other contexts, however. For example, some current schemes for digital currencies involve users' systems submitting transaction requests to central, administrative, clearing servers, which maintain data structures (for example, hash chains) that can be queried to try to determine if a transaction is valid for a given transaction period and that a given unit of digital currency was not already spent (the double-spending problem). In some implementations, each currency user or currency unit is associated with a unique hash chain or other data structure, which will have some form of "current" (such as "uppermost" or "most recent") output value, which can form the values xi used in embodiments of the synchronization method and system described above. As of now, there is no protocol for coordination among the central servers to enable system-level agreement on the set of valid transactions in a given transaction period. Embodiments of the invention above could be adapted to enable such agreement—the administrative servers would thereby act as the nodes Ni, and the values xi could be either the uppermost aggregation values, with transaction information forming the digital input records that feed up through the hash tree, or currency clearing servers associated with some group of users could submit their "uppermost" or "current" data as values analogous to xi values, or users' servers could submit transaction requests directly to the nodes (without a one-to-one association), which then agree on a final, approved set of transactions.

Figure 11:
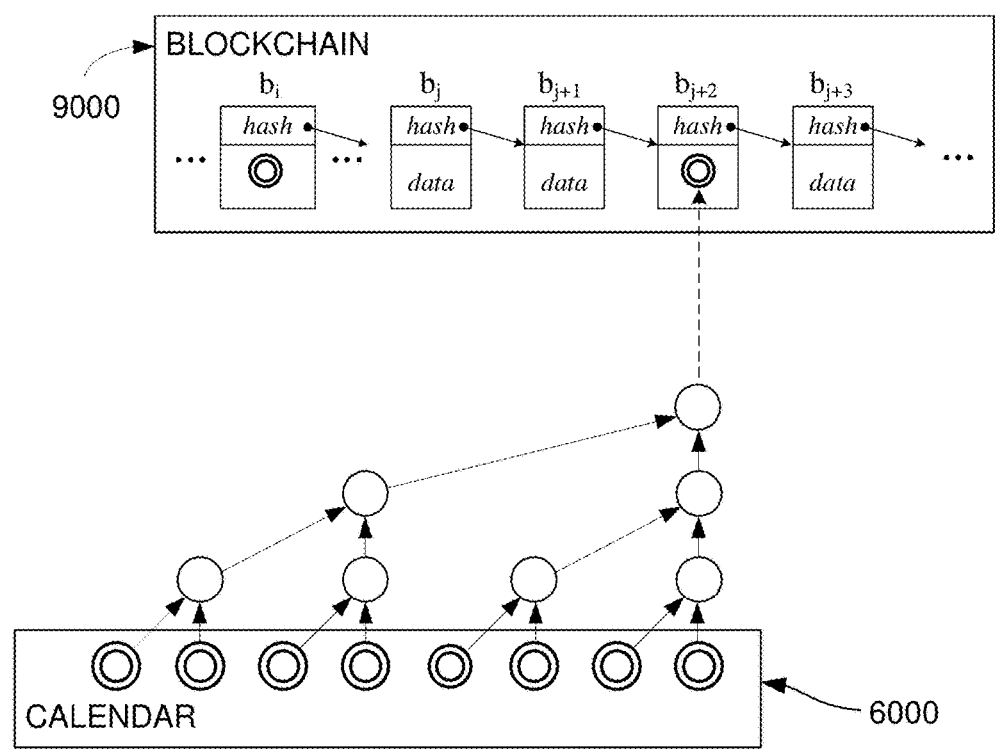
FIGS. 11 and 12 illustrate respective embodiments in which either calendar values individually, or in digital combination over a period, are committed to a distributed, widely witnessed data structure such as a blockchain.
Figure 12:
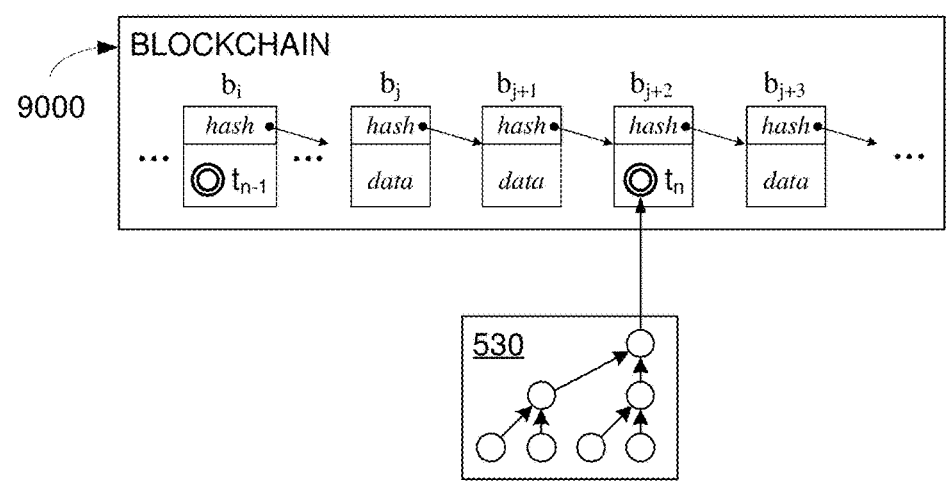

In the embodiments shown in FIGS. 4 and 5, the calendar values during a calendar period are combined in a Merkle tree to produce a composite value that may be published in some unalterable form, such as a physical or electronic medium or data structure, such as in print (such as a newspaper, many copies of which are widely distributed), in a widely distributed or witnessed database or web-based entry, etc. Here, "unalterable" means that it cannot be changed without detection, that is, that the mathematical or physical difficulty of tampering with data without being detectable is so great that no reasonable person would doubt the result of the verification/detection scheme. FIGS. 11 and 12 illustrate an embodiment in which the "medium" is a data structure that can be widely witnessed, and, as such, practically impossible to tamper with without detection. One such data structure is known as a "blockchain" 9000.

Although the term "blockchain" itself, as well as related terms, do not yet have universally accepted definitions, typically a "blockchain" is understood as being a data structure comprising a series of usually (but not necessarily) time-stamped blocks $b_i, \ldots, b_j, b_{j+1}, b_{j+2}, b_{j+3}, \ldots$, where each block includes data corresponding to one or more transactions, hashed together with linking data, such as the hash output, of an immediately preceding block. The chain can then be used to create a ledger, which is typically an append-only database. Once data is entered into a block of the chain, the entry is essentially irrefutable, since any tampering with the data would be reflected in the chained hash calculations and is thus easily detected.

One current point of dispute when it comes to the concept of a "blockchain" is whether, by definition, any entity may be allowed to submit blocks to and verify blocks in the blockchain, possibly only upon meeting some proof-of-work requirement (such as Bitcoin's "mining"), or whether the entities that may submit to and verify blocks in the data structure must be permissioned by some central authority. For example, an entity such as a bank or a government agency may not even want other entities to be able to enter blocks into or otherwise affect "its" blockchain; the bank, for example, may choose to use a blockchain totally under its control as a way to ensure the veracity of its records for both customers and auditors. In other words, there is dispute as to whether "blockchain" by definition implies "open" or not. Embodiments of this invention do not presuppose or require either definition.

In FIG. 11, the composite calendar value for each calendar period is entered, using any appropriate mechanism, for example, using proof-of-work, other multi-entity consensus, by permission, or simply by design (for example, in the case of a totally internally controlled blockchain), etc., for the chosen type of blockchain, as a block in the blockchain 9000.

Some blockchains have a non-trivial settlement time. For example, there may be a delay on the order of ten minutes for an updated state of a Bitcoin blockchain to be accepted. In such cases, it may be preferable to consolidate several calendar values and submit this as a single transaction. One way to do this is already disclosed above: The composite calendar value formed as the root of the Merkle tree in the core 5000, as shown in FIG. 4, is itself a consolidation of several calendar values. Thus, the composite value may be the transaction submitted at the end of each period Tp. The period Tp may then be adjusted according to the blockchain settlement time.

Assuming the blockchain can be appended to fast enough, it would also be possible to submit each calendar value as a separate transaction to the blockchain. This alternative is illustrated in FIG. 12. In these cases, use of a Merkle tree to consolidate calendar values into a composite value may not be necessary, and the Merkle tree computations in the core could be eliminated—in essence, the blockchain could serve the function of the calendar itself; viewed in "reverse", the calendar in this case is a blockchain.

Regardless of which values (each calendar, or composite calendar) are submitted as blockchain transactions, the signatures distributed to users may be extended to include parameters identifying, for example, the respective transaction, that is, block, in the blockchain in which the user's input's calendar value was a part. Given a purportedly true copy of the original input record, its corresponding signature, and this blockchain block-identifying information, one would then be able to verify the signature up to the level of the calendar value, and onward to the blockchain, thereby totally verifying (or confirming alteration of) the input record.

We claim:

1. A method for synchronizing an authentication network, comprising:

receiving, at a plurality of nodes, highest level output values from a plurality of aggregators, each highest level output value being formed from digital combinations of successively lower-level output values computed in lower levels as node values of a tree data structure having lowest level inputs formed as digital transformations of digital input records;

associating each aggregator as a primary associated aggregator with a respective one of the nodes;

in each node, compiling a local set of the received highest level output values;

after each aggregator has at least attempted to transmit its highest level output value to the respective one of the nodes with which it is associated as a primary associated node, exchanging received highest level output values among the nodes, each said node forming the local set of said node from the highest level output values received from the aggregator which is associated as a primary associated aggregator with said node, and the other nodes;

determining a final set of highest level output values as a function of occurrence of the received highest level output values in the different local sets;

if the final set is a subset of all the local sets whose corresponding node's primary associated aggregator's highest level output value is included in the final set, returning, from such node, to each such primary associated aggregator whose highest level output value is included in the final set recomputation parameters enabling recomputation of the current period value; and computing a current period value as a digital combination of the received highest level output values in the final set;

storing a transaction value in a block of a blockchain, said transaction value encoding the current period value;

in which:

the function of the occurrence is that each received highest level output value included in the final set is present in at least a first threshold number of the local sets.

2. The method of claim 1, in which the transaction value is the current period value itself.

3. The method of claim 1, in which the current period value is computed as an uppermost value of a hash tree having the final set of highest level output values as leaf values.

4. The method of claim 3, further comprising, for at least one aggregator whose highest level output value is included in the final set, returning, from any of the nodes having the final set, recomputation parameters enabling recomputation of the current period value.

5. The method of claim 4, in which each node forms its local set from the highest level output values received from any of the aggregators.

6. The method of claim 3, further comprising distributing recomputation parameters downward to user-level systems for association with respective ones of the digital input records such that an arbitrary subsequent test digital record is considered authenticated relative to the corresponding digital input record if, applying the corresponding digital transformation to the test digital record and, using the recomputation parameters to recompute the node values corresponding to upward traversal through the tree data structure, the same current period value is attained as when it was originally computed with the corresponding digital input record forming the lowest level input;
in which:
the recomputation parameters are keyless and therefore independent of any trust authority parameters; and
the recomputation parameters include an identifier of the block of the blockchain in which the respective current period value is encoded.

7. The method of claim 6, in which the digital combinations are cryptographic hashes.

8. The method of claim 7, in which the recomputation parameters include, for each digital input record, sibling node values in a directed path in the tree data structure from the digital transformations of the digital input record up to the current period value.

9. The method of claim 1, further comprising weighting the received highest level output values in determination of the final set.

10. A data authentication system comprising:
a core node system configured to communicate via a network with a plurality of other core node systems and to receive a highest level output value from at least one aggregator, each highest level output value being formed as hash values of successively lower-level output values computed in lower levels as node values of a tree data structure having lowest level inputs formed as corresponding digital transformations of respective digital input records;
said core node system including
an exchange module configured to exchange with the other core node systems at least one of the highest level output values said core node system has received directly from the at least one aggregator and to compile a respective local set of the highest level output values received both directly and from other core node systems;
a resolution module configured to determine a final set of highest level output values as a function of occurrence of the received highest level output values in the respective local sets compiled within said core node system and said other core node systems; and
a computation module computing a current period value as a function of the received highest level output values in the final set, said current period value encoding the digital input records and forming part of respective digital signatures for each of the digital input records whose values are encoded in any of the highest level output values in the final set;
said computation module further causing a transaction value to be stored in a block of a blockchain, said transaction value encoding the current period value;
in which:
the function of occurrence is that each received highest level output value included in the final set is present in at least a first threshold number of the local sets compiled within said core node system and said other core node systems;
the core node system is configured to receive the highest level output value from only a single one of the at least one aggregator, which thereby comprises a primary associated aggregator for said core node system, such that said core node system receives the highest level output value directly from only the said single one of the at least one aggregator, but other aggregators' highest level output values indirectly, from respective ones of the other core node systems;
the exchange module is further configured, after each aggregator has at least attempted to transmit the respective highest level output value to the node with which said aggregator is associated as the primary associated aggregator, to exchange received highest level output values among the other core node systems, the resolution module thereupon forming the local set from the highest level output values received from the associated aggregator and the other core node systems;
the core node system further including a computation module configured if the final set is a subset of all the local sets whose corresponding node's primary associated aggregator's highest level output value is included in the final set, to return, from the core node system to the associated aggregator, recomputation parameters enabling recomputation of the current period value given one of the digital input records and the respective digital signature of the said given one of the digital input records; and
the exchange module is further configured, after each aggregator has at least attempted to transmit the respective highest level output value to the node with which said aggregator is associated as the primary associated aggregator, to exchange received highest level output values among the other core node systems, the resolution module thereupon forming the local set from the highest level output values received from the associated aggregator and the other core node systems.

11. The system of claim 10, in which the transaction value is the current period value itself.

12. The system of claim 10, in which the computation module is configured to compute an uppermost value of a hash tree having the final set of highest level output values as leaf values.

13. The system of claim 12, in which:
said core node system is primarily associated with a selected one of the at least one aggregator, said selected one forming a primary associated aggregator,
the computation module is further configured to return to at least one of the at least one aggregator, other than the primary associated aggregator, recomputation parameters enabling recomputation of the current period value given one of the digital input records and the respective digital signature of said given one of the digital input records.

14. The system of claim 13, in which the core node system forms said respective local set from the highest level output values received from any of the at least one aggregator.

15. The system of claim 12, in which the computation module is further configured to distribute recomputation parameters downward to user-level systems for association with respective ones of the digital input records such that an arbitrary subsequent test digital record is considered authenticated relative to the corresponding digital input record if, applying the corresponding digital transformation to the test digital record and, using the recomputation parameters to recompute the node values corresponding to upward traversal through the tree data structure, the same current period value is attained as when it was originally computed with the corresponding digital input record forming the lowest level input;
in which:

the recomputation parameters are keyless and therefore independent of any trust authority parameters; and the recomputation parameters include an identifier of the block of the blockchain in which the respective current period value is encoded.

16. The system as in claim 15, in which the corresponding digital transformations are cryptographic hashes.

17. The system as in claim 16, in which the recomputation parameters include, for each digital input record, sibling node values in a directed path in the tree data structure from the digital transformations of the digital input record up to the current period value.

* * * * *